United States Patent
Brothers et al.

(10) Patent No.: US 6,822,955 B1
(45) Date of Patent: Nov. 23, 2004

(54) PROXY SERVER FOR TCP/IP NETWORK ADDRESS PORTABILITY

(75) Inventors: John David West Brothers, Alpharetta, GA (US); Jeffrey G. Smith, Alpharetta, GA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/057,578

(22) Filed: Apr. 9, 1998

Related U.S. Application Data

(60) Provisional application No. 60/072,175, filed on Jan. 22, 1998.

(51) Int. Cl.[7] .............................................. H04L 12/56
(52) U.S. Cl. ..................... 370/389; 370/401; 709/226; 709/249
(58) Field of Search .............................. 370/352, 353, 370/356, 389, 392, 401; 709/220, 249, 250

(56) References Cited

U.S. PATENT DOCUMENTS

| | | | | |
|---|---|---|---|---|
| 5,440,547 A | * | 8/1995 | Easki et al. ................. | 370/395 |
| 5,802,285 A | * | 9/1998 | Hirviniemi .................. | 709/250 |
| 5,805,805 A | * | 9/1998 | Civanlar et al. ............ | 709/220 |
| 5,991,828 A | * | 11/1999 | Horie et al. .................... | 710/8 |
| 5,999,536 A | * | 12/1999 | Kawafuji et al. ........... | 370/401 |
| 6,006,275 A | * | 12/1999 | Picazo, Jr. et al. .......... | 709/249 |
| 6,016,318 A | * | 1/2000 | Tomoike ..................... | 370/401 |
| 6,061,650 A | * | 5/2000 | Malkin et al. ............... | 704/228 |
| 6,064,675 A | * | 5/2000 | Alexander et al. .......... | 370/401 |
| 6,070,187 A | * | 5/2000 | Subramaniam et al. ..... | 709/220 |
| 6,075,776 A | * | 6/2000 | Tanimoto et al. ........... | 370/254 |
| 6,091,732 A | * | 7/2000 | Alexander, Jr. et al. .... | 370/401 |
| 6,108,330 A | * | 8/2000 | Bhatia et al. ................ | 370/352 |
| 6,130,892 A | * | 10/2000 | Short et al. .................. | 370/401 |
| 6,154,777 A | * | 11/2000 | Ebrahim ...................... | 709/227 |
| 6,189,042 B1 | * | 2/2001 | Keller-Tuberg ............. | 709/238 |
| 6,381,650 B1 | * | 4/2002 | Peacock ...................... | 709/245 |
| 6,484,318 B1 | * | 11/2002 | Shioda et al. ............... | 725/110 |
| 6,535,493 B1 | * | 3/2003 | Lee et al. .................... | 370/329 |
| 6,542,497 B1 | * | 4/2003 | Curry et al. ................. | 370/352 |

FOREIGN PATENT DOCUMENTS

WO    WO 98/40990    9/1998

OTHER PUBLICATIONS

IP Network Index, Internet Publication, Author unknown, publication date unknown.
Don't Forget To Configure The Default Gateway, Internet Publication, Author unknown, publication date unknown.
Crawley, Don R., Soundtraining.net, Basic IP Addressing, Internet Publication, publication date unknown.
Proxy ARP, Internet Publication, Author unknown, Apr. 16, 1996.

(List continued on next page.)

*Primary Examiner*—John Pezzlo
*Assistant Examiner*—Saba Tsegaye
(74) *Attorney, Agent, or Firm*—Withrow & Terranova, PLLC

(57) ABSTRACT

System and method for fully transparent IP mobility services for clients in a dynamic LAN Ethernet environment. The functionality within a proxy server, a combination of network address translation, proxy address resolution protocol, and proxy domain name service, allow the proxy server to support and provide full IP client functionality to any IP-enabled network device in any proxy server enabled LAN. The proxy server may be added to an existing Ethernet (or Ethernet-emulated) LAN. Once configured with the necessary subnet range, DNS, and IP pools, the proxy server provides support for any mobile device that enters the LAN.

16 Claims, 24 Drawing Sheets

OTHER PUBLICATIONS

Network Address Translation Technical Discussion, Internet Publication, Author unknown, Apr. 18, 1996.

Crawley, Don R., "Basic IP Addressing (Classful IP Addressing)" Internet Publication, Author unknown, publication date unknown.

Reasons For The Address Resolution Protocol (ARP), Internet Publication, Author unknown, publication date unknown.

Giovanardi, et al., Transparent Mobile IP: an Approach and Implementation, 1997 IEEE, pp. 1861–1865.

Groom, F. M., The Structure and Software of the Internet, 1997 Annual Review of Communications, pp. 695–707.

Yeom, et al., IP Multiplexing by Transparent Port–Address Translator, 1996 LISA X—Sep. 29–Oct. 4, 1996, pp. 113–121.

Internet Protocol: DARPA Internet Program Protocol Specification, prepared by Information Sciences Institute (USC), Sep. 1981, pp. 1–43.

Dynamic Host Configuration Protocol, prepared by Bucknell University, Mar. 1997, pp. 1–45.

An Ethernet Address Resolution Protocol, prepared by David C. Plummer (Symbolics, Inc.), Nov. 1982, 7 pages.

Transmission Control Protocol: DARPA Internet Program Protocol Specification, Sep. 1981, pp. 1–85.

IP Mobility Support, prepared by C. Perkins (IBM), Oct. 1996, pp. 1–79.

Reverse Tunneling for Mobile IP, prepared by G. Montenegro (Sun Microsystems, Inc.), May 1998, pp. 1–18.

Domain Names—Concepts and Facilities, prepared by P. Mockapetris (ISI), Nov. 1987, pp. 1–55.

Routing Information Protocol, prepared by C. Hedrick (Rutgers University), Jun. 1988, pp. 1–33.

User Datagram Protocol, prepared by J. Postel (ISI), Aug. 28, 1980, pp. 1–3.

* cited by examiner

PROXY SERVER FOR TCP/IP NETWORK ADDRESS PORTABILITY

This application claims the benefit of U.S. Provisional Application 60/072,175, filed Jan. 22, 1998.

BACKGROUND OF THE INVENTION

The present invention relates generally to address portability and, more particularly, to a method and apparatus for address portability to provide fully transparent internet protocol (IP) mobility services to IP-enabled network devices in any Ethernet local area network (LAN).

The transmission control protocol/internet protocol (TCP/IP protocol), a suite of communications protocols used by host computers to exchange information between application processes over LANs or wide area networks (WANs), was designed when laptops and other mobile IP devices were essentially nonexistent. As a result, there was no issue with mobility, since each IP network device was typically a workstation, minicomputer, or the like. The movement of devices from place to place in such a static environment was expected to be a very rare occurrence, and one that could be adequately handled by manual intervention. This assumption, in conjunction with various resource constraints, influenced the development of the IP protocol such that each LAN only operated with a limited range (a subnet) of IP addresses. Any device with an IP address outside of that range was simply ignored by the LAN's router, rendering it unable to communicate with any device within that network.

Over the last several years, the IP protocol has become the primary data communications protocol on virtually every computer in the world. This includes a substantial number of laptops and other portable computer devices. As the prevalence of laptops increases, IP mobility issues have substantially increased. For example, it is now common for customers, vendors, and even business associates that have laptops or other mobile IP devices to attempt to hook into a "foreign" LAN and attempt to use its facilities. Typically, this results in significant frustration since the amount and complexity of reconfiguration to permit the connection is not insubstantial.

One attempted solution to this problem, dynamic host configuration protocol (DHCP), evolved over the last couple of years. Under DHCP, a computer configured to use that protocol may retrieve local IP configuration data automatically when the mobile IP device is connected to the network. While this is a reasonable solution to mobility problems, its scope is somewhat limited. For example, the mobile network device must be configured to use DHCP, and the LAN must have a DHCP server enabled. Moreover, the duration of DHCP "timeouts" within the mobile network device must be short enough to allow the device to request a new address at the new location. As a result of at least these limitations, DHCP has not sufficiently solved the problem. In some cases, DHCP has proven unacceptable to the network clients who may not have DHCP pre-configured or to network administrators who wish to have more knowledge of and control over the mobile IP devices that enter and leave the network.

It is, therefore, desirable to provide fully transparent IP mobility services for clients in a dynamic network environment.

SUMMARY OF THE INVENTION

Systems and methods consistent with the present invention satisfy this and other needs by supporting and providing full IP client functionality to any IP-enabled network device in any mobility-enabled LAN. The present invention provides full functionality regardless of both the IP address of the mobile device and subnet restrictions of the LAN.

A method for use with a proxy server consistent with the present invention establishes communications between a device in a first network and a destination device having an arbitrary address on a second network outside of the first network. The method includes the step of generating an address resolution protocol packet to identify the arbitrary address for the destination device. The proxy server receives the address resolution protocol packet and generates an address resolution protocol response packet including the arbitrary address of the destination device. The method also includes the step of transmitting the address resolution protocol response packet from the proxy server to the device in the first network.

Another method consistent with the present invention is for use with a proxy server and establishes communications between a random device and a destination device having an arbitrary address on a network. The method includes the steps of generating an address resolution protocol packet to identify the arbitrary address for the destination device and receiving, by the proxy server, the address resolution protocol packet. The method also includes the steps of generating an address resolution protocol response packet including the arbitrary address of the destination device and transmitting the address resolution protocol response packet from the proxy server to the random device.

Yet another method consistent with the present invention is for use with a proxy server which is in communication with a mobile device and remote name server. The method permits obtaining an internet protocol address from the remote name server for the mobile device and includes the steps of generating a query packet including a request for an address associated with a domain name and receiving the query packet from the mobile device in the proxy server. The method also includes the steps of forwarding the query packet to the remote name server and generating a response packet including the requested address. The method also includes transmitting the response packet to the proxy server and transmitting the response packet to the mobile device.

Another method consistent with the present invention is for use with a proxy server and provides for communications between a random device and a destination device in a network. The method includes the steps of performing a proxy address resolution protocol to initiate communications between the random device and the destination device, performing a proxy domain name service to identify a destination address in the second network associated with a domain name, and performing a network address translation of an arbitrary random address associated with traffic from the random device to an appropriate address for routing the traffic to the destination device in the network. Use of this combination allows a system to support and provide full client functionality to mobile network devices.

Systems are also provided for carrying out these and other methods consistent with the present invention.

Several advantages accrue to method and systems consistent with the present invention. For example, these systems and methods provide a secure and complete mobility solution, including the various cases where prior art solutions were inadequate. Such systems and methods are completely transparent to the end-user, who may or may not use DHCP, but will still be able to communicate with a LAN or even with a WAN. They are also more "administratorfriendly", especially when the acceptance protocol involves e-mail notification to the network administrator tat a new device has joined the network. Security is enhanced by reducing the network's exposure to foreign snooping.

The above and additional features and advantages of the present invention will be readily appreciated by one of ordinary skill in the art from the following detailed description.

DETAILED DESCRIPTION OF THE PREFERRED EMBODIMENTS

Figure 1:
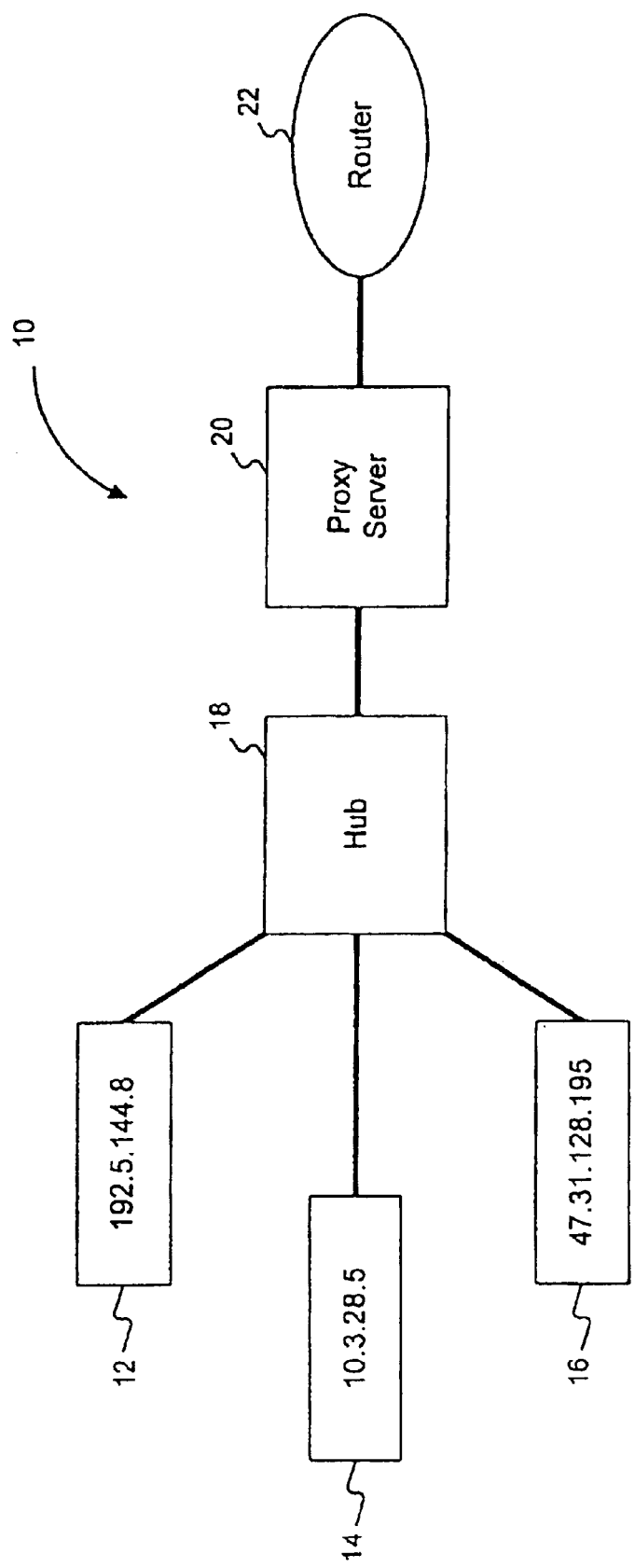
FIG. 1 is a diagram of a random Ethernet LAN environment consistent with the present invention.

Reference will now be made in detail to embodiments consistent with this invention that are illustrated in the accompanying drawings. The same reference numbers in different drawings generally refer to the same or like parts.
Two-Armed Proxy Server FIG. 1 shows a "random" LAN 10. For purposes of this discussion, "random" simply means there are a random number of mobile IP network devices, and those devices each use a random IP address. One example of a "random" LAN would an IP Ethernet network in a hotel. LAN includes a plurality of interconnected mobile IP network devices, including laptops 12, 14, and 16, having IP addresses scattered across the range of known addresses. As shown, the plurality of network devices communicate through a hub 18 and a proxy server with network router 22. The links used to interconnect the various network elements shown may, for example, be Ethernet links. In the LAN 10, proxy server may be referred to as a "two-armed" (TA) proxy server since it possesses two network interfaces, e.g., two Ethernet links.

Normally, this type of network would be extremely difficult to manage, since a standard router expects all IP addresses that it serves to fall within a limited range. Consistent with the present invention, however, traffic from each of these devices may be modified so that the information presented to the network router is acceptable. The modification may be accomplished by proxy server using a combination of network address translation (NAT), a proxy address resolution protocol (ARP) service, and a proxy domain name system (DNS) service, as discussed below. NAT is a well-known process by which traffic received by and transmitted from a particular device with an arbitrary IP address is modified to present the correct IP address to a network router. NAT service may be specifically configured to translate particular IP addresses. A proxy mobility server consistent with the present invention may translate random IP addresses dynamically.

Figure 2:
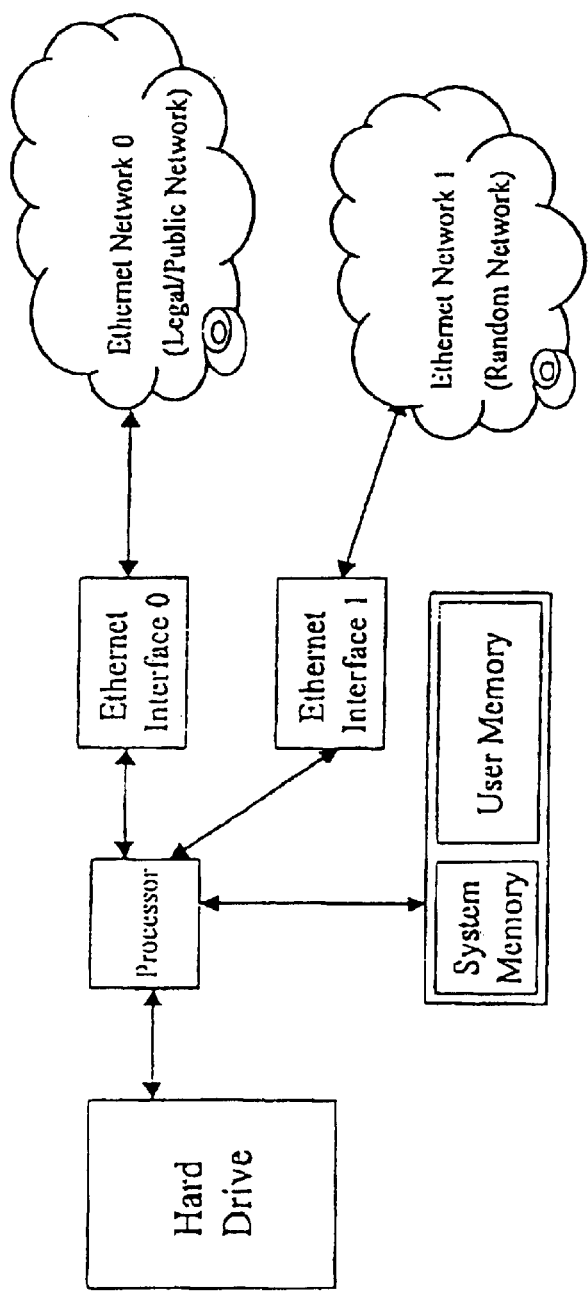
FIG. 2 is a high level system diagram of a proxy server consistent with the present invention.

FIG. 2 illustrates a high level diagram of proxy server 20. As shown, proxy server includes a processor in communication with a hard drive, a system memory, and a user memory. The system and user memories may include read-only and/or random access types of memories. These memories are useful for storing packet contents, which may includes addresses and the like, as well as data content and packet length, to name a few. Proxy server also includes interfaces, which may take the form of cards, through which proxy server communicates with networks. In the example shown, proxy server is interfaced with a legal/public network and a random network through Ethernet interface 0 and Ethernet interface 1, respectively.

Figure 3:
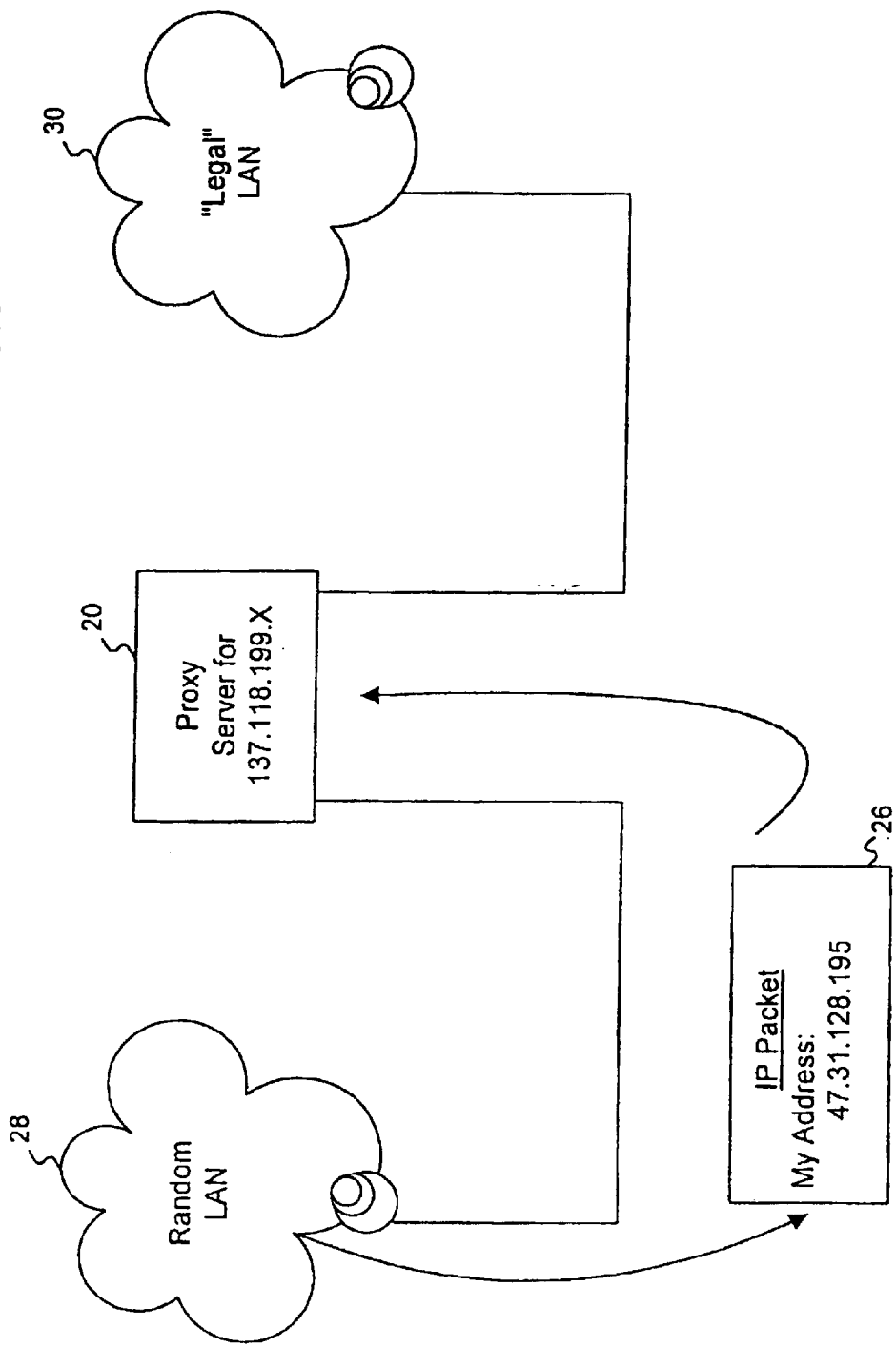
FIGS. 3 and 4 illustrate network address translation associated with the routing of traffic from a random LAN to a legal LAN consistent with the present invention.
Figure 4:
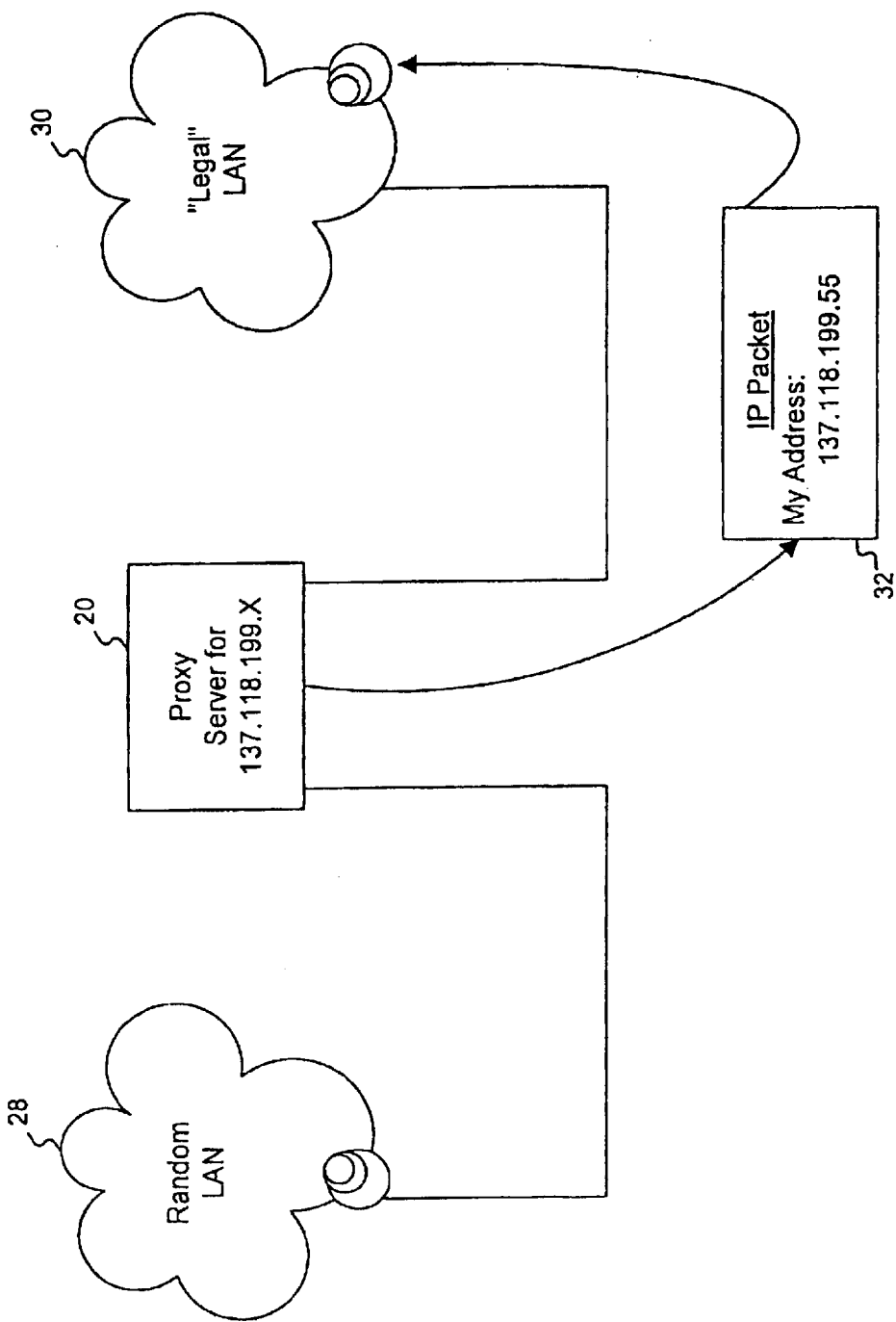
Figure 5:
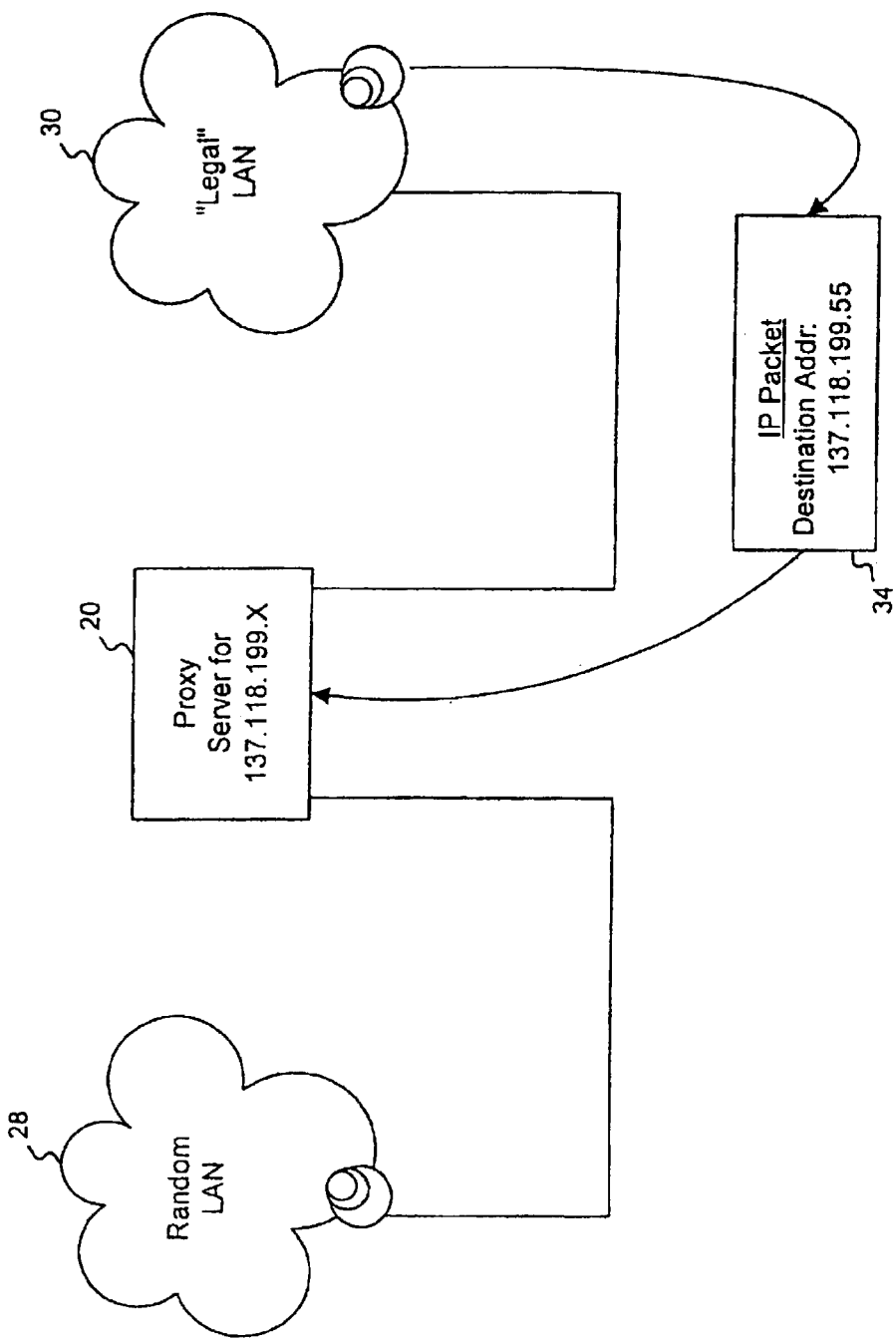
FIGS. 5 and 6 illustrate network address translation associated with the routing of traffic from a legal LAN to a random LAN consistent with the present invention.
Figure 6:
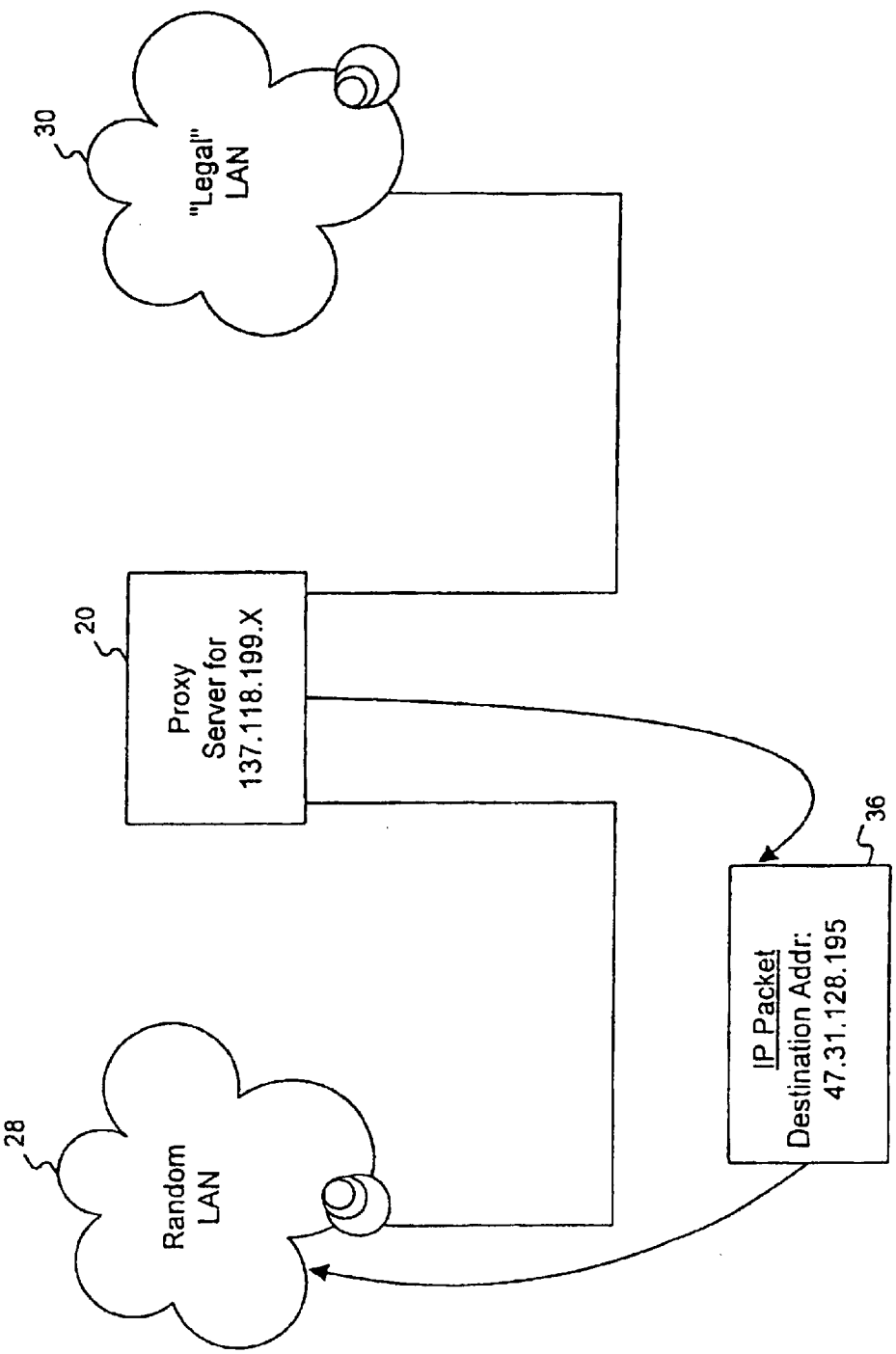

FIGS. 3 and 4 depict the routing of information, such as an IP packet 26, from a device within a random LAN 28 to a device within a "legal" LAN 30. For purposes of this discussion, a "legal" LAN is simply a public LAN, i e., one with a legal set of IP addresses. In FIG. 3, packet 26 from the device, which has an IP address of 47.31.128.195, is routed from random LAN 28 to proxy server 20. As shown, proxy server is a server for a subnet (here denoted 137.118.199.X) which, as is known, is a set of machines that are physically connected together in an Ethernet LAN, e.g., the legal LAN in FIG. 3. Proxy server performs a network address translation and, as shown in FIG. 4, the translated packet 32 is transmitted to the legal LAN. The translation may be performed using known techniques, such as those specified in Internet Engineering Task Force Request for Comments (IETF RFC) 1631. A packet following the opposite path, i.e., packet 34 routed from a device within legal LAN to a device within random LAN 28, would also undergo network address translation (to translated packet 36) in proxy server (see FIGS. 5 and 6).
Proxy ARP In addition to NAT, proxy server may employ a proxy address resolution protocol (ARP) service to provide mobile functionality consistent with the present invention. ARP is a known protocol which may be used by a network device to discover what other devices are connected to the local network. Proxy ARP service allows TA proxy server to "spoof" mobile network IP devices having random IP addresses into thinking that server is the device with which those mobile IP devices wish to communicate. This is necessary when the mobile IP device first boots and attempts to determine its gateway. As is known, existing proxy ARP implementations are limited in their use since only traffic from certain select specific addresses can be handled. Proxy ARP consistent with the present invention is not so limited and may be used to identify any arbitrary address.

Figure 7:
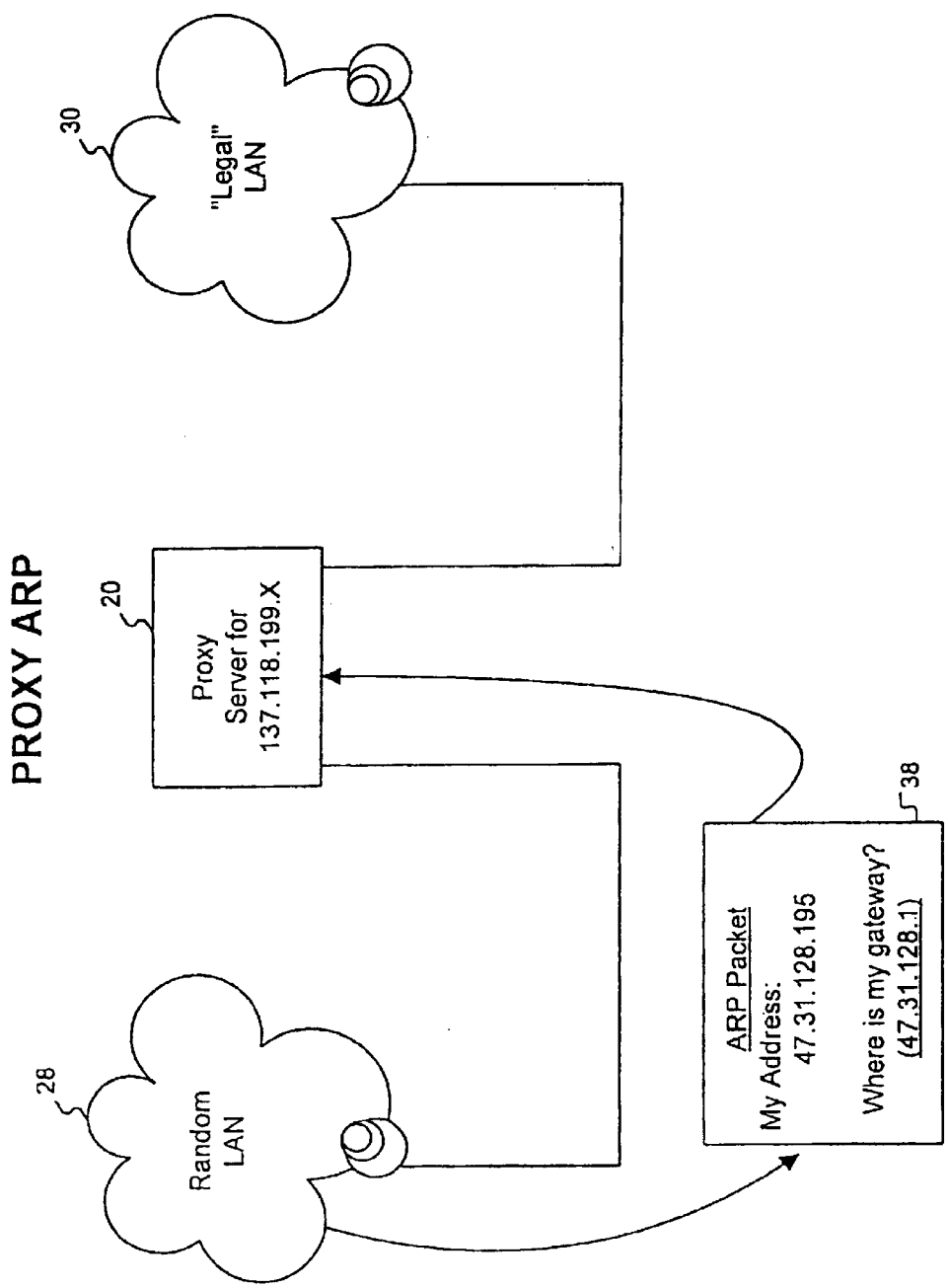
FIGS. 7 and 8 illustrate generation of a proxy address resolution protocol (ARP) packet and generation of a proxy ARP response packet consistent with the present invention.
Figure 8:
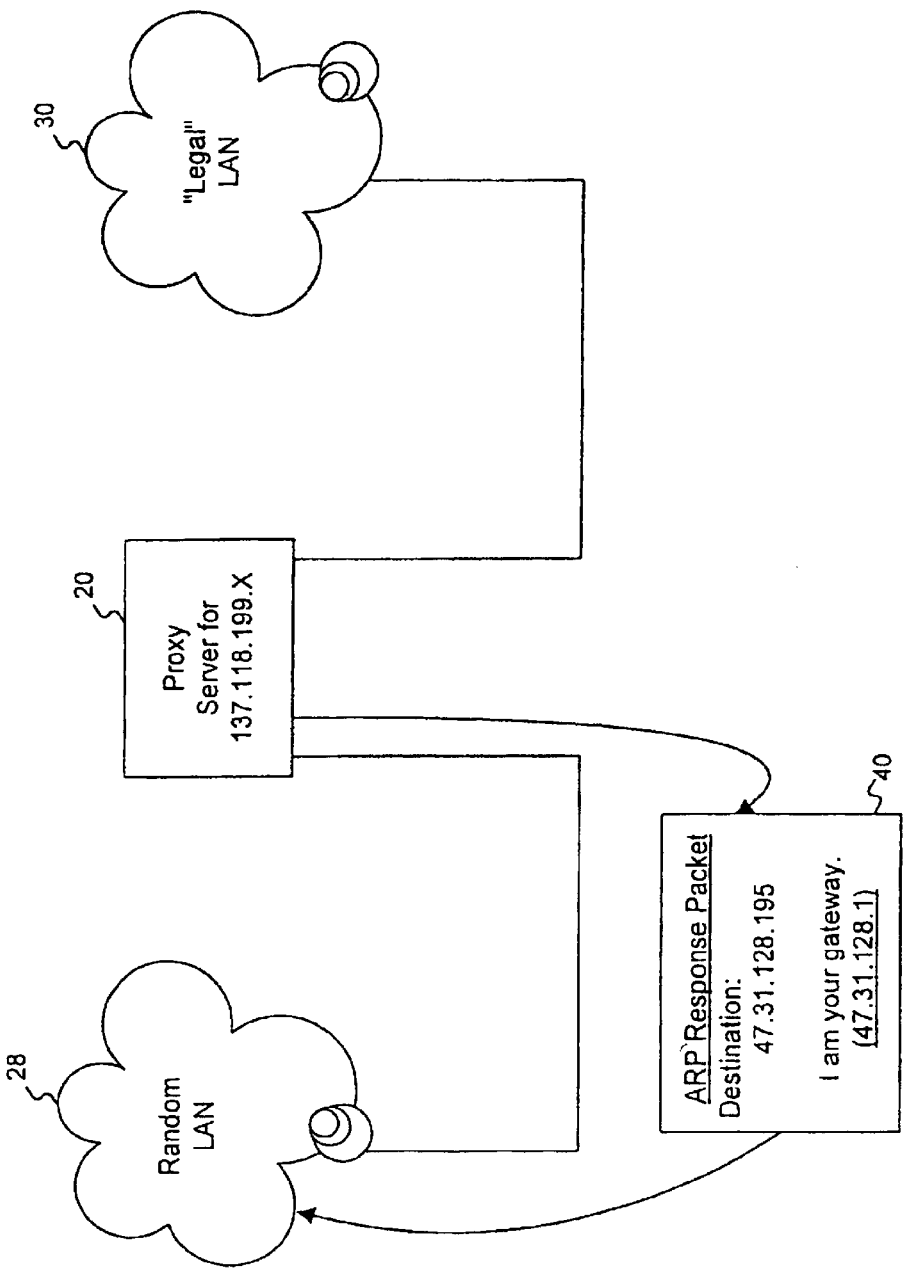

FIG. 7 illustrates an ARP packet 38 being transmitted by a mobile device in random LAN 28 to proxy server 20. As shown, ARP packet 38 includes the address of the sending device, as well as a query from the device regarding the whereabouts of its gateway, which has the address of the gateway sought. The gateway, which may be a network router, connects the smaller LAN (e.g., a random LAN) to a larger WAN (e.g., a public LAN, such as the "legal" LAN of FIG. 7) and passes traffic from the LAN to the WAN. When a mobile device in the random LAN wishes to send traffic to a device having an arbitrary address in a second network (e.g., the WAN) outside of the LAN, the sending device needs to know to which gateway device the traffic should be sent. While normally the gateway is on the same network as the mobile device that is searching for it (using the ARP), this is not possible in a random LAN. Accordingly, the proxy server pretends that it is the gateway, and the mobile device will use it to reach the WAN. In response to receiving ARP packet 38, proxy server generates an ARP response packet 40 destined for the sending device in random LAN 28. As shown in FIG. 8, response packet 40 includes the sending device's IP source address as the destination address and informs the sending device that proxy server is the device's gateway.

Figure 9:
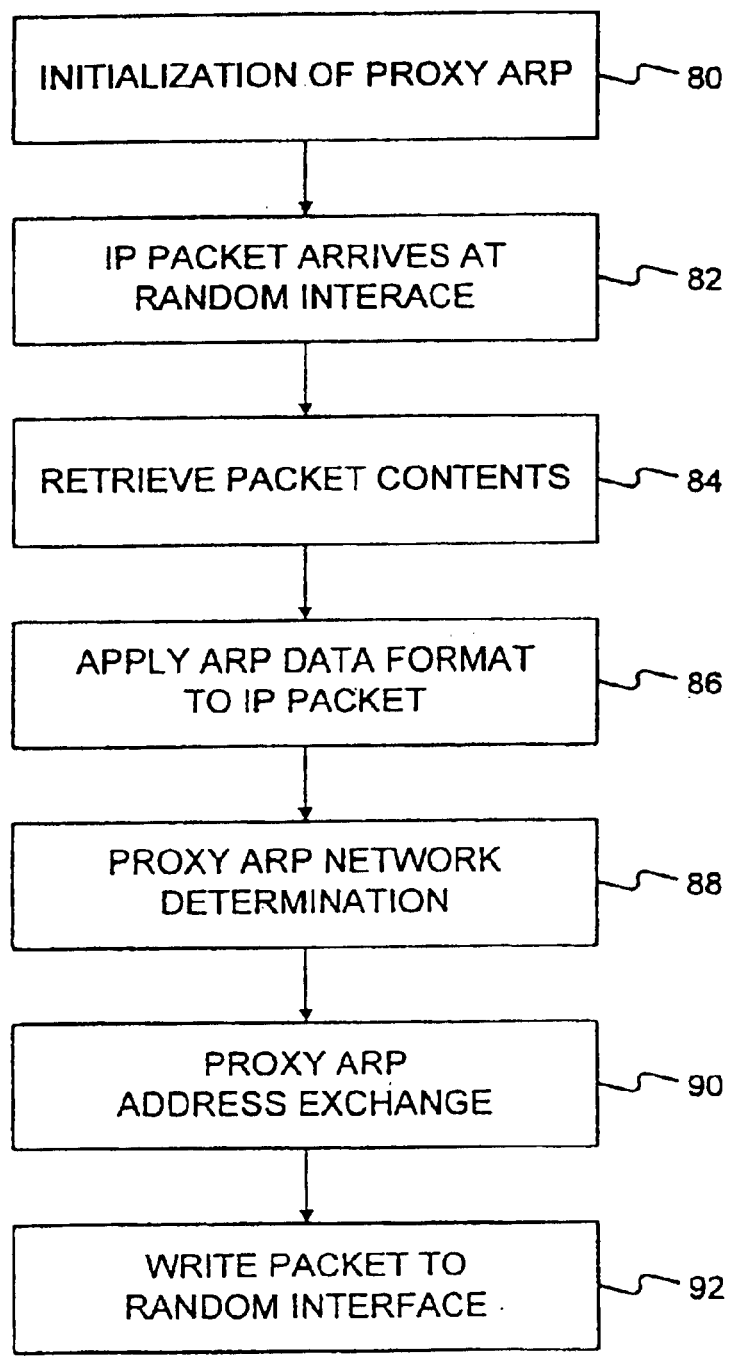
FIGS. 9–12 are flowcharts depicting steps for proxy ARP consistent with the present invention.
Figure 10:
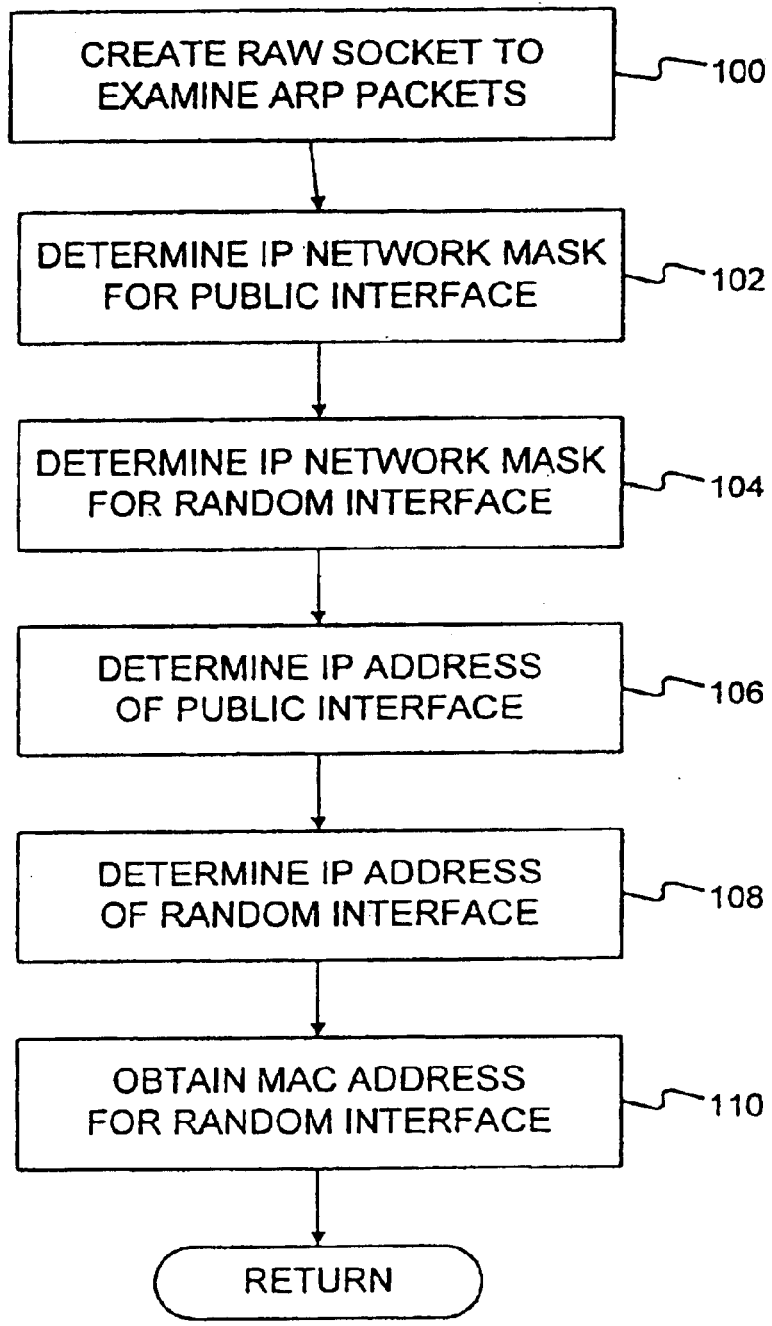

FIG. 9 depicts steps for proxy ARP consistent with the present invention. During initialization (step 80), IP addresses and network masks are determined, as shown in greater detail in FIG. 10. First, a raw socket is created to examine ARP packets (step 100). This socket is a communications programming interface created between proxy server and the random and public LANs. In the Redhat Linux operating system, only one such socket is needed, whereas other operating systems, such as Sun Microsystem's Solaris operating system, must create one socket per Ethernet interface. Next, IP network masks for both the public LAN interface and the random LAN interface are identified (steps 102, 104). As is known, these interfaces may be cards in proxy server 20. This information, used by the proxy server in combination with other information to determine what set of devices are part of the networks and, therefore, whether it can send packets directly to any mobile device or whether the packets must be sent through a router, is typically maintained in a stable storage device, such as hard disk, flash memory, and the like, in proxy server 20. Similarly, IP addresses of the public and random LAN interfaces are identified (steps 106, 108), as is the medium access control (MAC) address of the random interface (step 10). Like the IP network masks, these addresses are typically stored or built into proxy server 20.

With continuing reference to FIG. 9, when a new ARP packet from a random IP device, such as ARP packet 38 of FIG. 7, arrives at the random network interface from a mobile IP device in the random LAN (step 82), proxy server retrieves the packet contents from the operating system (step 84). The packet, as is known, has a header and data, which includes inter alia the packet source address (i.e., the address of the mobile device that sent the ARP packet) and the packet destination address (i.e., the address of that device's gateway). The server then applies the ARP data format to the IP packet (step 86). The ARP data format is defined in IETF Standard 37, and the application of the format to the data may be done using the standard method of casting.

Figure 11:
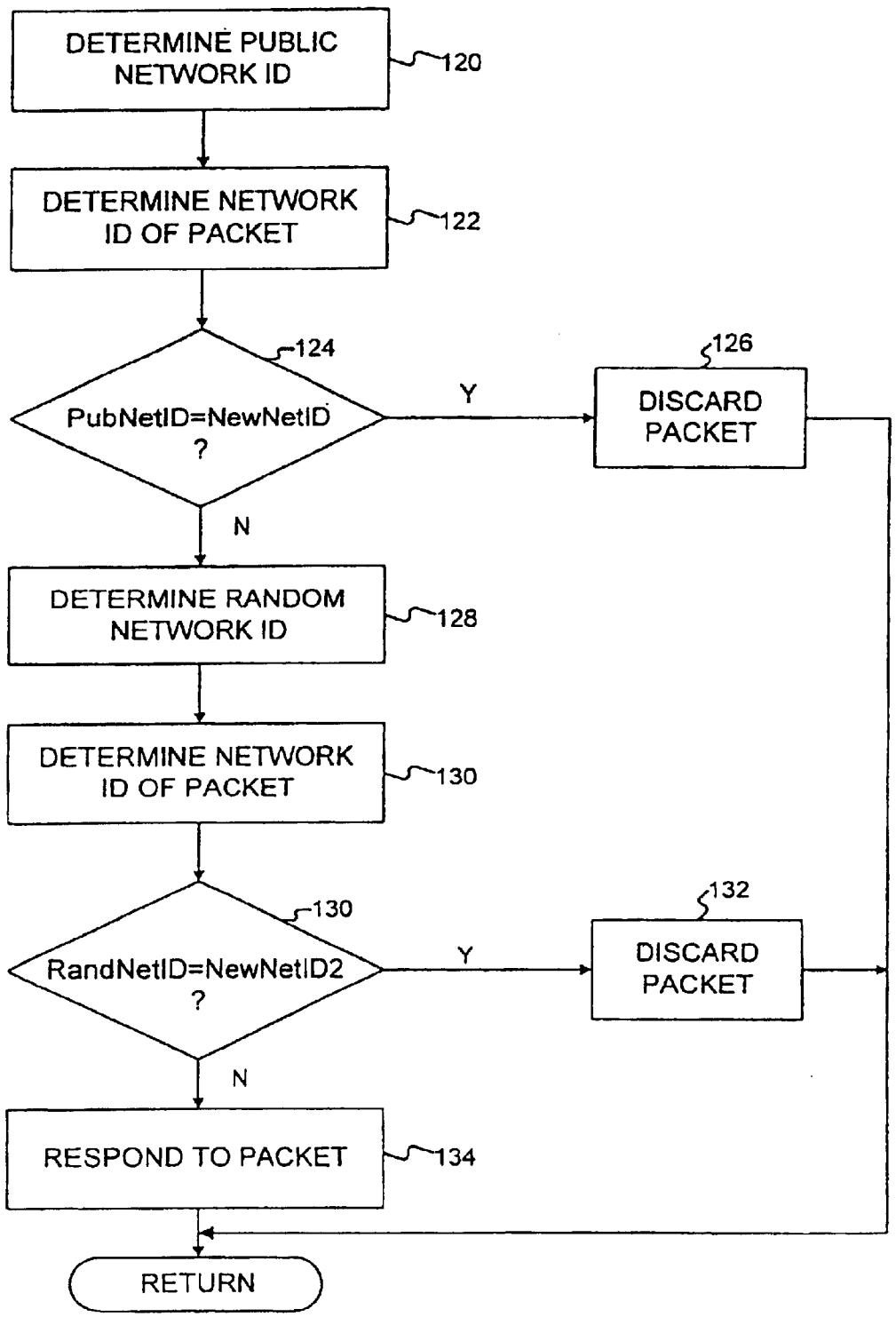

Next, the proxy server performs a proxy ARP network determination to determine the network to which the IP packet is destined for (step 88). FIG. 11 shows a flowchart detailing steps for this determination consistent with the present invention. A public network ID (PubNetID) is determined first (step 120). In one embodiment, the public network ID is derived from the public IP interface address and the IP network mask of the public LAN, e.g., logically "anding" the address with the mask. The proxy server uses the PubNetID to discover what network it is part of, i.e., what IP devices are local and which are not local. Devices that not local are reached through a router. Next, the proxy server determines if the IP destination address of the incoming packet is for a "local" network, i.e., the public LAN. In one embodiment, a network ID associated with the incoming packet (NewNetID) is determined (step 122) based on the destination IP address subcomponent of the ARP data structure associated with the ARP packet and the IP network mask of the public LAN interface, e.g., logically "anding" the destination address with the public IP network mask. If PubNetID is equal to NewNetID (step 124), the incoming packet is destined for a device that has an IP address on the public LAN but is physically part of or on the random LAN. The proxy server discards this incoming packet (step 126) because another device in the random LAN will receive the packet by Ethernet. The proxy server simply ignores the packet because it does not need to create a response packet; the intended device physically on the random LAN should respond.

If the incoming packet is not destined for the public LAN, a random network ID (RandNetID) may be determined based on the random IP address and the IP network mask of the random LAN, e.g., logically "anding" the address with the mask (step 128). The proxy server uses RandNetID to discover what devices are local to the random LAN. Devices that not local are reached through a router. A network ID associated with the packet (NewNetID2) is also determined (step 130). This may be determined based on the destination IP address sub-component of the ARP data structure associated with the ARP packet and the IP network mask of the random LAN interface, e.g., logically "anding" the destination address with the random IP network mask. The proxy server uses this information to determine if the IP destination address of the ARP packet is for a "local" network, i.e., the random LAN. RandNetID may then be compared to NewNetID2 (step 132). If RandNetId is equal to NewNetID2, the incoming packet is destined for a device that has an IP address on the random LAN and physically part of or on the random LAN. Again, the proxy server discards the incoming packet (step 134), since another device in the random LAN should respond and will receive the packet by Ethernet.

If the incoming packet has not been discarded by the proxy server based on these comparisons, the packet is destined for a device outside of a local network, i.e., from a device in a random LAN, such as a hotel, to a device outside of that LAN and physically part of, for example, a public LAN. Consistent with the present invention, the proxy server prepares an ARP response packet (step 136) to the incoming packet to convince the sending device that the proxy server is the device's gateway. The response ARP packet format is defined in IETF Standard 37.

Figure 12:
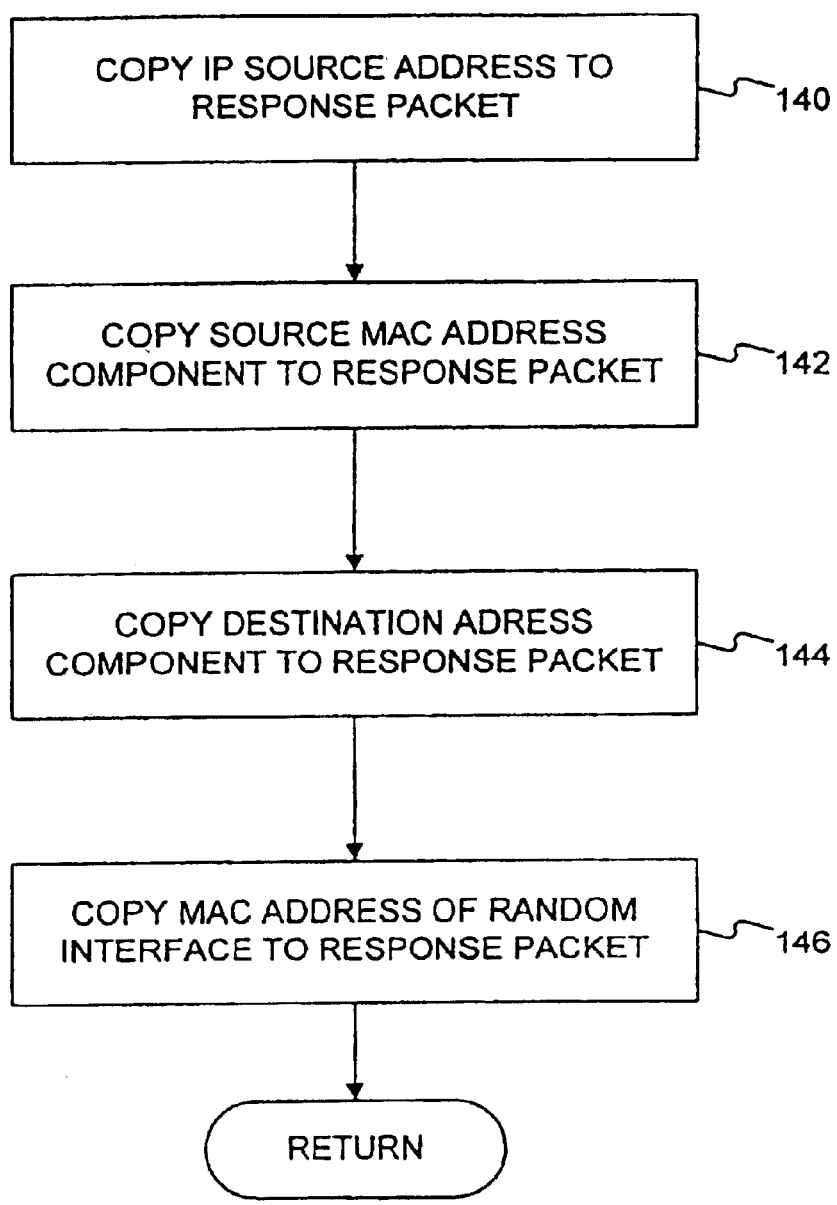

Referring once again to FIG. 9, once an ARP response packet has been created, a proxy ARP address exchange is performed (step 90), as shown in FIG. 12. Consistent with the present invention, the IP source address component from the incoming packet is copied into the destination address component of the response packet (step 140). This directs the response packet to the appropriate mobile IP device. Similarly, the source MAC address component of the incoming packet is copied to the destination MAC address of the response packet (step 142). The destination address component of the incoming packet is copied into the source address component of the response packet (step 144). Address exchange consistent with the present invention also contemplates filling in the source MAC address component of the response packet with the MAC address of the random interface (step 146). By inserting the operation component of the response packet with the appropriate value in network-byte order (e.g., the value "2" for RedHat Linux 5.0), the packet is considered a response packet for purposes of the ARP protocol.

Once the address exchange is completed, the response packet may be written to the random Ethernet interface using a standard system call (FIG. 9, step 92). When the mobile IP device receives the response packet, it will believe proxy server is its gateway from the random LAN to outside public LANs. Subsequent traffic destined for public LANs will be routed there by the proxy server.

Proxy DNS

Normally, a mobile network device communicates with a nearby network element commonly referred to as a DNS server. The DNS server functions to translate an IP name input by a user, such as "undefined.etherloop.com," into a corresponding IP address, such as 137.118.199.33. Thus, when a mobile IP device user inputs an IP name as an intended destination, the device communicates with the DNS server, which then performs a translation, e.g., a name lookup. However, with a random LAN, this is not possible.

Figure 13:
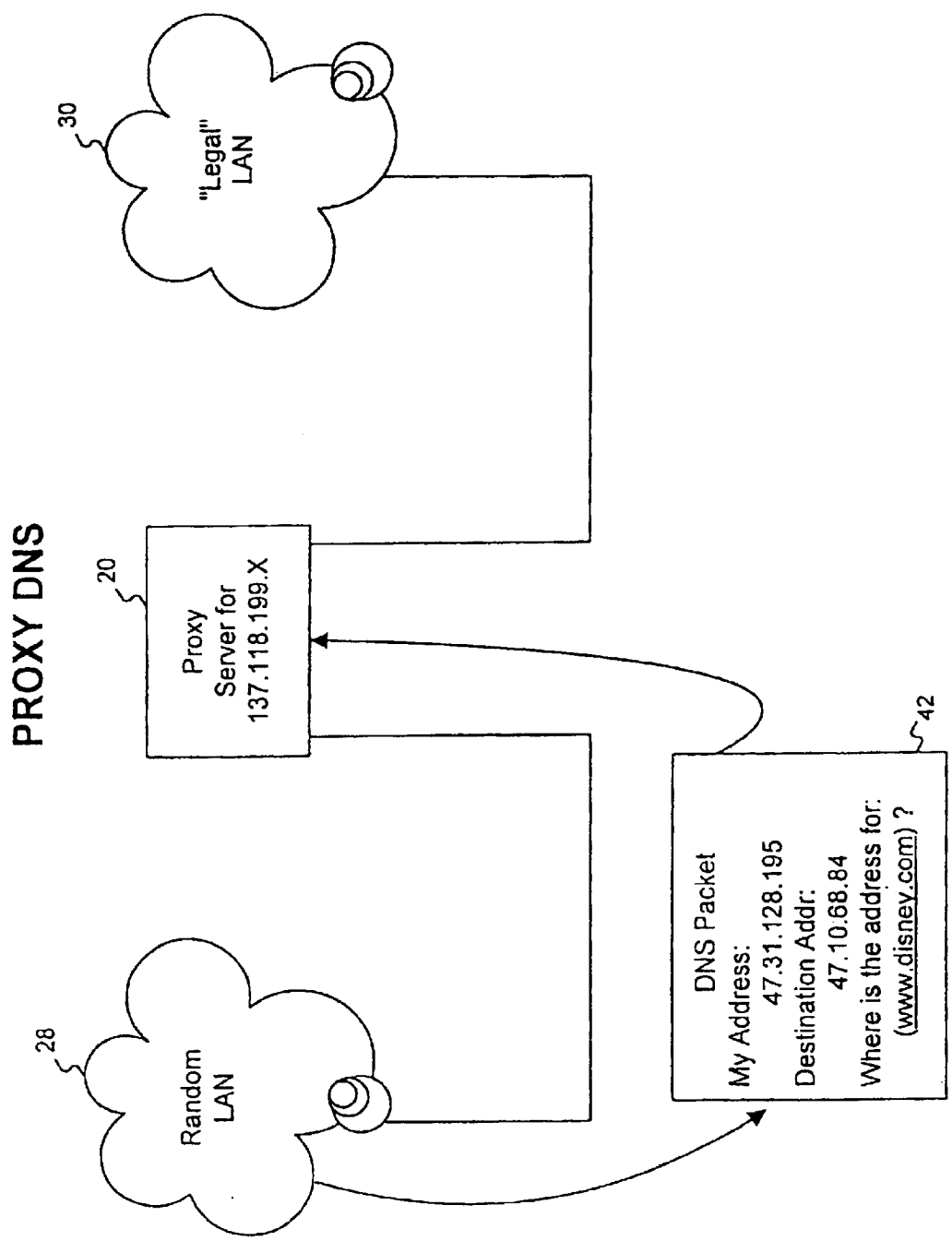
FIGS. 13 and 14 illustrate generation of a proxy domain name service (DNS) query packet and generation of a proxy DNS response packet consistent with the present invention.
Figure 14:
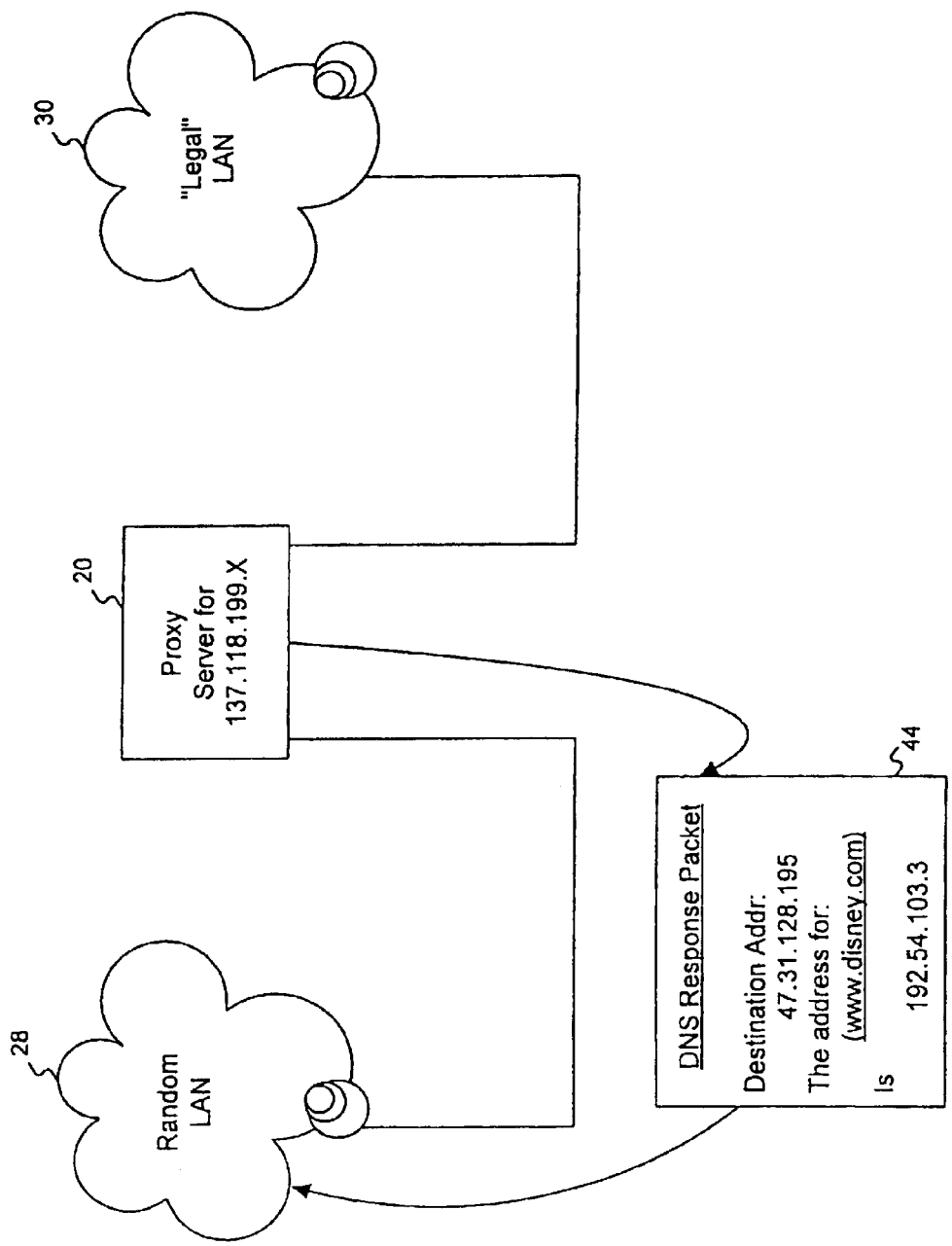

FIG. 13 shows the transmission of a DNS packet 42 from a mobile IP device within random LAN 28 to proxy server 20. Consistent with the present invention, the proxy server pretends that it is the correct DNS server and handles the DNS translation activities. In general, DNS packet 42 includes the IP address of the sending mobile IP device, a destination address, i.e., the address of the DNS server, which is typically preconfigured in the device, and the IP name the device is seeking an IP address for. Proxy server 20 redirects the request to a local process, i.e., a process within the proxy server 20 which, in turn, performs the required translation. After the translation is performed, proxy server 20 generates a DNS response packet 44 (see FIG. 14) which includes the address of the sending network device as a destination address and the IP address corresponding to the IP name.

Figure 15:
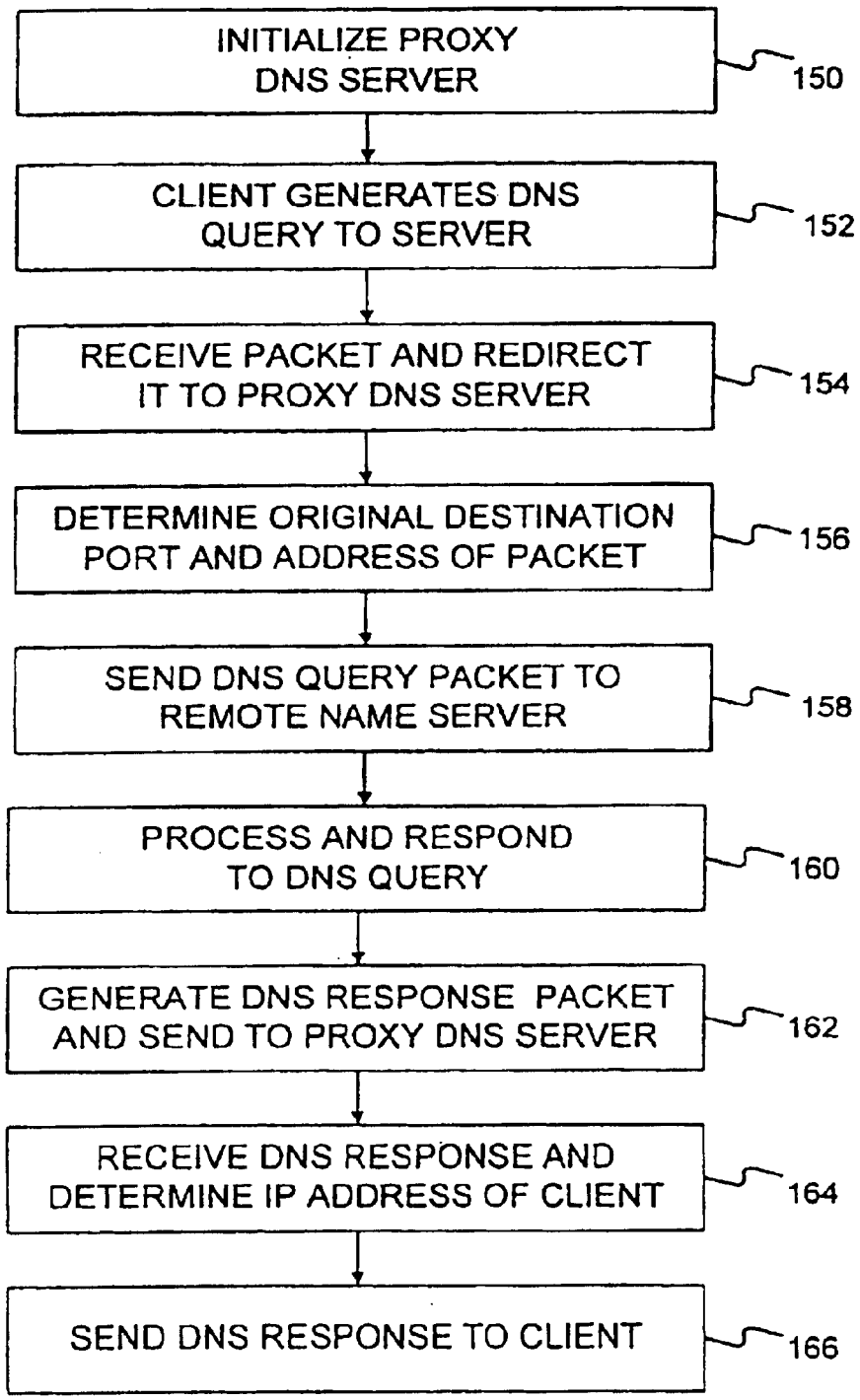
FIGS. 15 and 16 are flowcharts depicting steps for proxy DNS consistent with the present invention.
Figure 16:
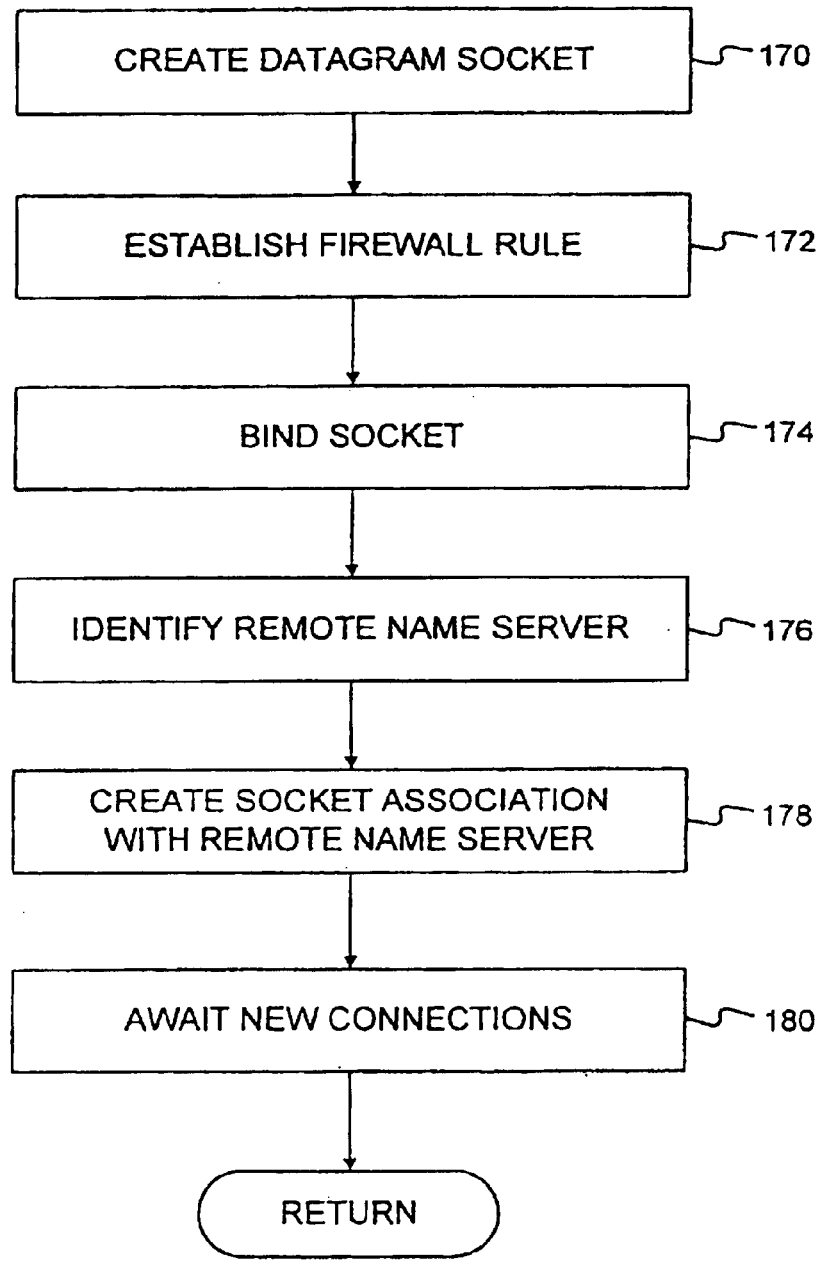

FIG. 15 depicts steps for proxy DNS consistent with the present invention. First, the proxy DNS server 20 is initialized (step 150). As shown in FIG. 16, during initialization, proxy server 20 creates an unreliable datagram protocol (UDP) datagram socket (step 170) using known methods. This socket is a communications interface between the local process (proxy DNS) and the operating system. Proxy server 20 also establishes a firewall rule such that any packet headed for any destination in any LAN or WAN (i.e., any IP address) from any source in any LAN or WAN with a destination port of "53" is delivered to the proxy server 20 at the same port, i.e., port "53" of the server (step 172). Port "53" is the port for the DNS server of the host machine (a machine with an IP address). The socket can then be bound to port "53" using standard methods (step 174), such that any DNS query with a destination of port "53" is routed to the local process (proxy DNS). The identity of a remote name server physically located outside the random LAN on the Internet is also identified by the proxy server using, for example, a configuration file or some other known method (step 176). After creating a UDP socket association between the proxy DNS server and the identified remote name server (step 178), proxy server enters a loop waiting for new connections, such as new DNS queries from the random LAN or DNS responses from the remote name server, using standard methods (step 180).

After proxy DNS initialization, a "random" client (i.e., a device in the random LAN having an IP address, such as 1.1.1.1) makes a DNS query to the identified remote name server (e.g., having an IP address, such as 2.2.2.2) at port "53" (step 152) using standard DNS protocol, e.g., IETF standard 13. Proxy server receives the packet and, based on the port address used as the destination port (ie., port "53"), redirects the packet to the proxy DNS server (the local process within the proxy server) (step 154) using, for example, firewall redirection code built into Linux Redhat 5.0. The proxy DNS server in turn receives the packet and determines the original destination address (i.e., 2.2.2.2) and port (i.e., port "53") of the intended destination, storing them in appropriate variables. In Redhat Linux 5.0, this may be accomplished using an appropriate system call to collect the packet data from the kernel.

The proxy DNS server may then send the DNS query packet to the remote name server identified during initialization (step 158). The proxy DNS server creates a new UDP socket, a communications interface between it and the remote name server. Typically, the proxy DNS server uses a separate socket and port (such as port "2001," in this example) which may be arbitrarily assigned) for each mobile device IP address so as to be able to identify to which device in the random LAN the response should be sent. The remote name server then processes and responds to the DNS query from the proxy DNS server, as defined in IETF Standard 13 (step 160). A DNS response packet, which includes the requested address, is generated by the remote name server and sent to the proxy server using the port defined in step 158 (ie., port "2001" in this example). Proxy server (such as proxy server 20) receives the DNS response from the remote name server on the specified port (i.e., port "2001") using, for example, standard Unix system calls and determines the IP address of the client (i.e., 1.1.1.1 in this example) using that port (step 164). The DNS response is then sent to the client by the proxy server (step 166; see also FIG. 14), which performs a source address and port modification. In one embodiment, the proxy server modifies the source address (the address of the proxy server, e.g., 3.3.3.3 in this example) and source port of the response packet (the port of the link back to the client, which may be arbitrarily assigned) to the original destination address (i.e., 2.2.2.2 in this example) and the original destination port (i.e., port "53" in this example) of the DNS query packet, respectively.

One-Armed Proxy Server

The TA proxy server described above is extremely well-suited for operation in any environment where a fully random assortment of users may attempt to connect to the LAN. As previously noted, one such environment is a hotel environment. Today, hotel guests frequently have mobile network devices, such as laptops, and wish to connect via Ethernet, EtherLoop, or the like, into the hotel's network and from there to the Internet to retrieve electronic mail and conduct other business.

A TA proxy server, however, may not fit well into a LAN networking community since most end-user network devices will have a stable IP address, correctly configured and assigned for the LAN, unlike the hotel environment. Moreover, a TA proxy server increases latency (delay) on a network. For at least these reasons, there is a need for proxy routers that do not interfere with the normal operation of a LAN. These services will exist on a normally configured LAN and only begin operation only when a random interloper, i.e., an individual device, connects to the network. The device that supports this service will be lower in cost and will not create any performance problems for the standard network traffic.

Figure 17:
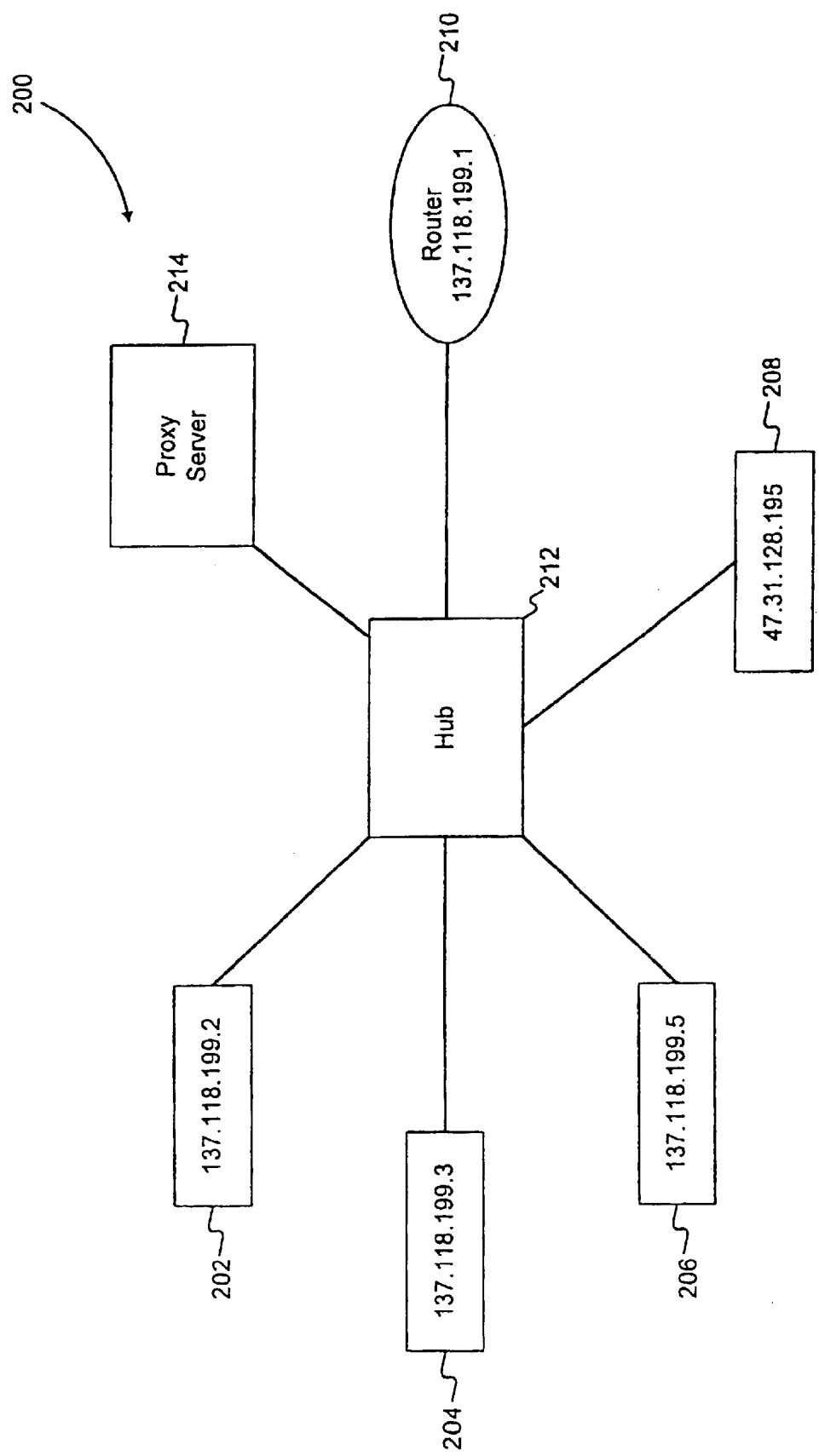
FIG. 17 illustrates an alternative proxy server implementation consistent with the present invention.
Figure 18:
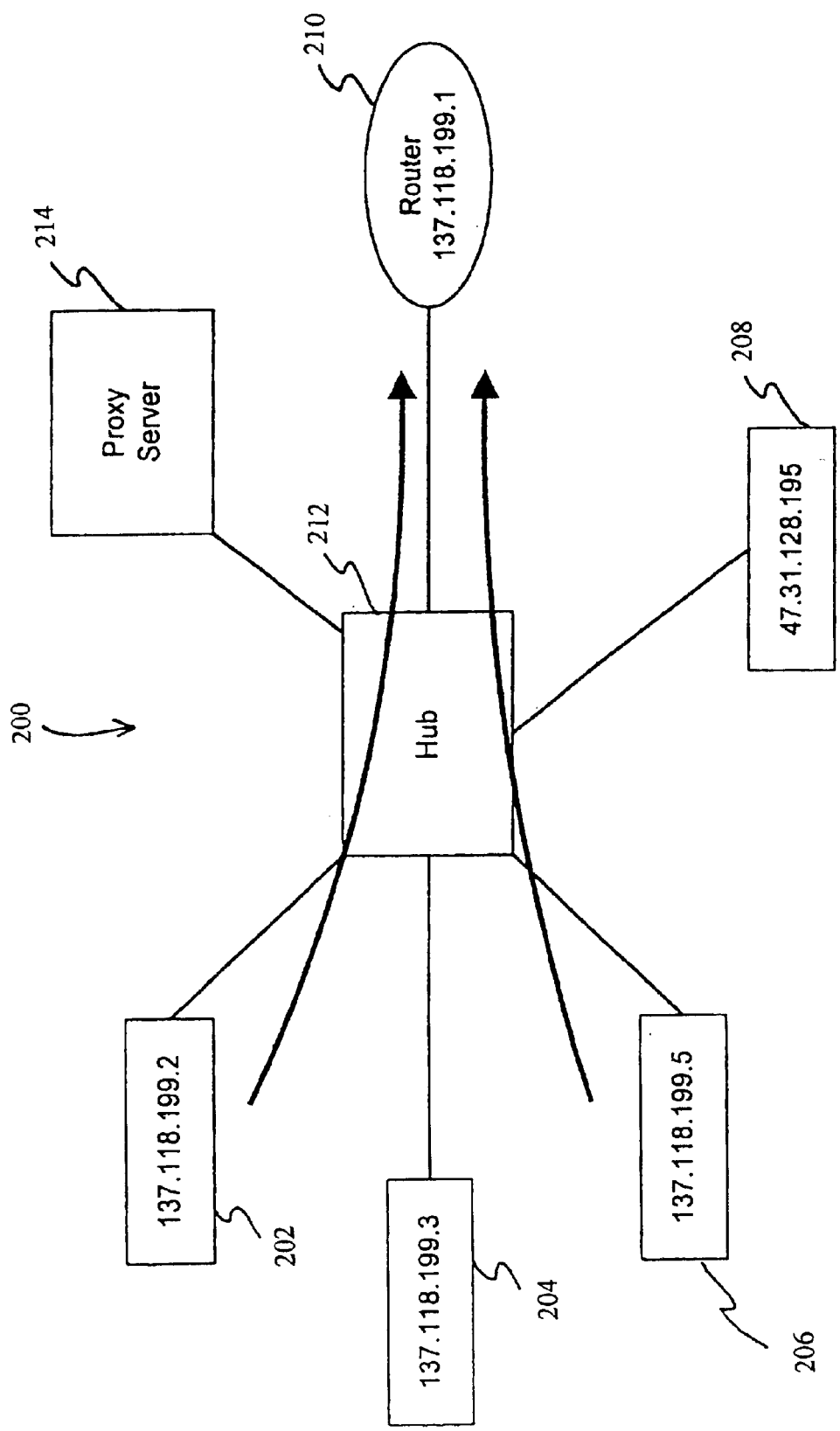
FIG. 18 illustrates normal traffic flow in the alternative proxy server implementation of FIG. 16.

FIG. 17 illustrates an alternative proxy server implementation consistent with the present invention that satisfies this need. In this implementation, LAN 200 includes a plurality of mobile IP network devices 202, 204, and 206 which communicate with a router 210 through hub 212. The links used to interconnect the various network elements shown may, for example, be Ethernet links. Proxy server 214 communicates with the various network elements through a single link, e.g., a single Ethernet interface. As such, proxy server 214 may be referred to as one-armed proxy server. Generally, proxy server 214 includes the same hardware as proxy server 20 (FIG. 2). The same Ethernet interface receives data from LAN 200 and delivers translated data back to the LAN. In FIG. 17, the majority of the devices on the network are on the same network as the router. These devices operate normally without any interference from proxy server 214, which is always listening to the traffic on this network. Device 208, an interloper with an address of 47.31.128.195 will not be able to directly communicate with the router, which ignores all traffic from an address that is not in its network domain (i.e., 137.118.199.X). One of the benefits of this implementation is that the standard network traffic is not interrupted by the proxy server, as shown in FIG. 18. As with the TA proxy server of FIG. 1, one-armed proxy server 214 performs network address translation, proxy ARP, and proxy DNS services to provide similar fully transparent client functionality to any IP-enable network device.

Network Address Translation

Figure 19:
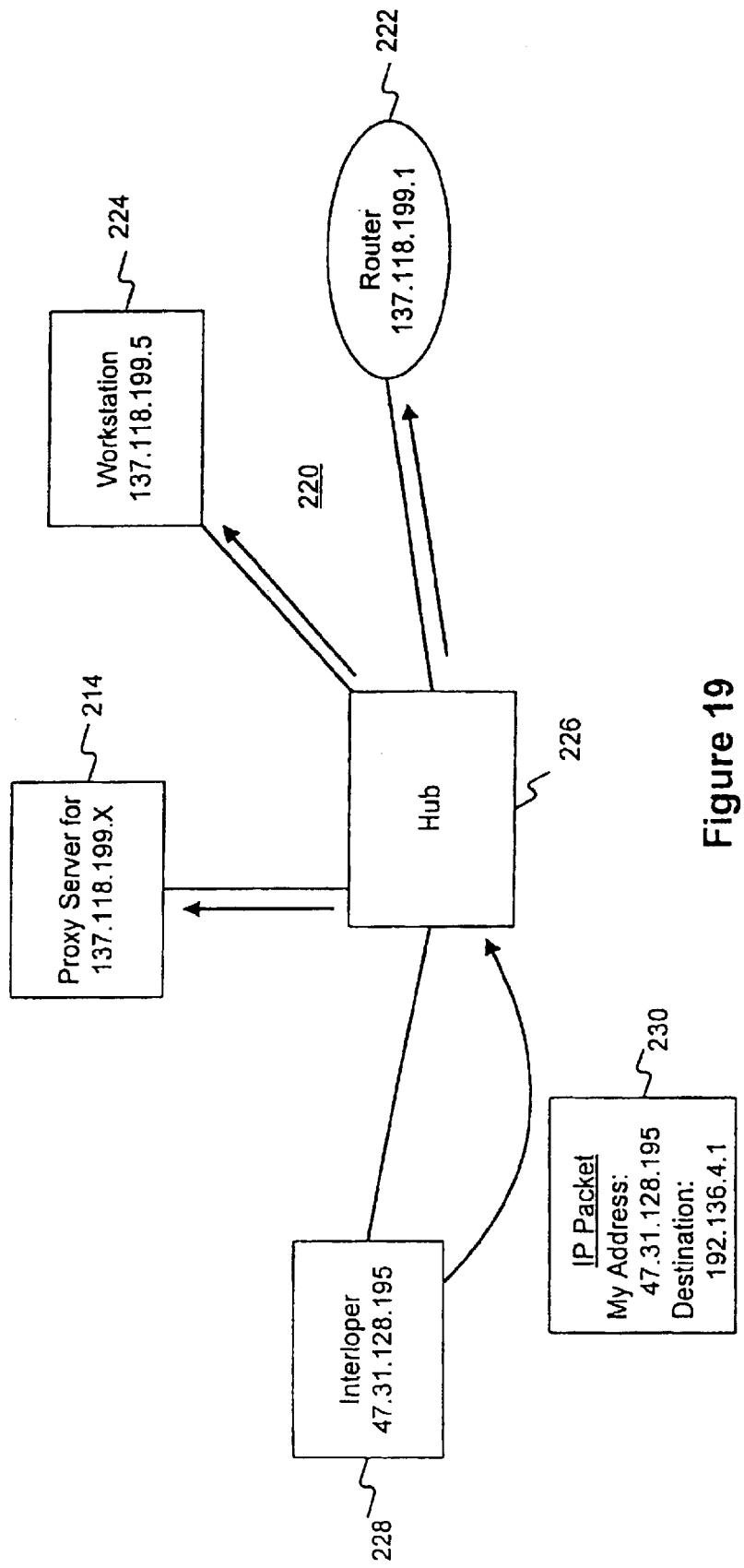
FIGS. 19–22 illustrate network address translation for use with the alternative proxy server implementation consistent with the present invention.

FIG. 19 depicts a network environment useful for discussing NAT performed by one-armed proxy server 64. Network 220, an Ethernet type of network, includes a plurality of interconnected network elements including router 222, workstation 224, hub 226, and proxy server 214. Interloper 228 is also connected to LAN 220, although it is a foreign IP-enabled network device relative to the network, i.e., it is not part of LAN 220.

As shown in FIG. 19, interloper 228 generates a packet 2for a LAN/WAN other than the LAN 220. Packet 2includes the IP address of the transmitting device, interloper 228, as well as an IP address of the destination device, which is not particularly shown. Due to the nature of Ethernet networks, every element on the LAN receives packet 230 from hub 226. The IP protocols within workstation 224 and similar network elements recognize that the destination is not a local network device and consequently ignore the packet. Router 222 may or may not accept packet 2depending on the source IP address.

Even if the router accepts the packet and passes it on to the LAN/WAN, the packet will not return to the router (address 137.118.199.1) since the source address is 47.31.128.195.

Figure 20:
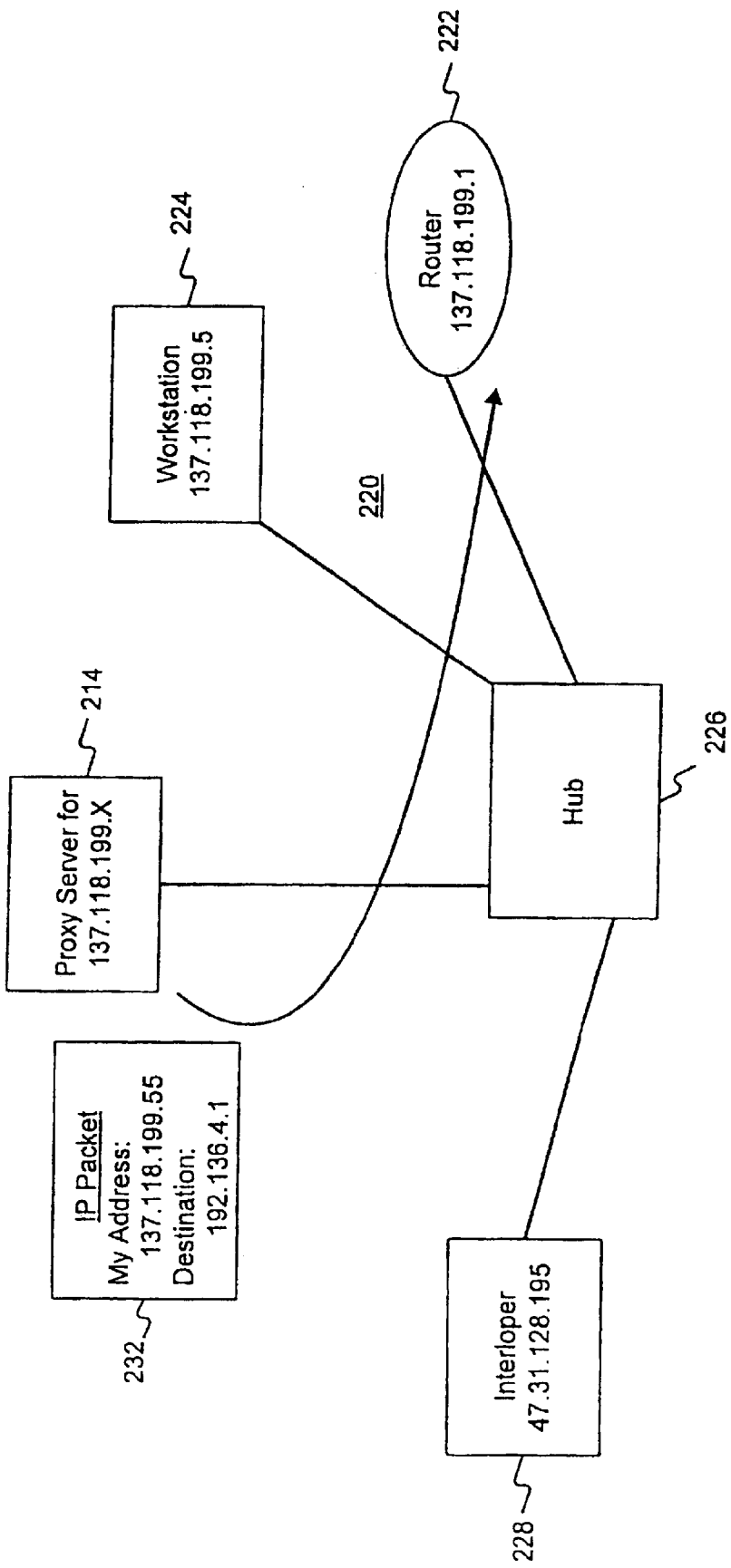

Proxy server 214, however, recognizes that it is capable of properly translating packet 2into translated packet 232 having an acceptable format utilizing known address translation methods (see FIG. 20). Since translated packet 232 has an associated IP address recognizable by router 222, the router believes packet 232 originated from within LAN 220 and not by a foreign mobile device, i.e., interloper 228. As shown, packet 232 includes the same destination address as packet 230. Once router 222 receives this packet, it can send the packet on to the Internet as normal.

Figure 21:
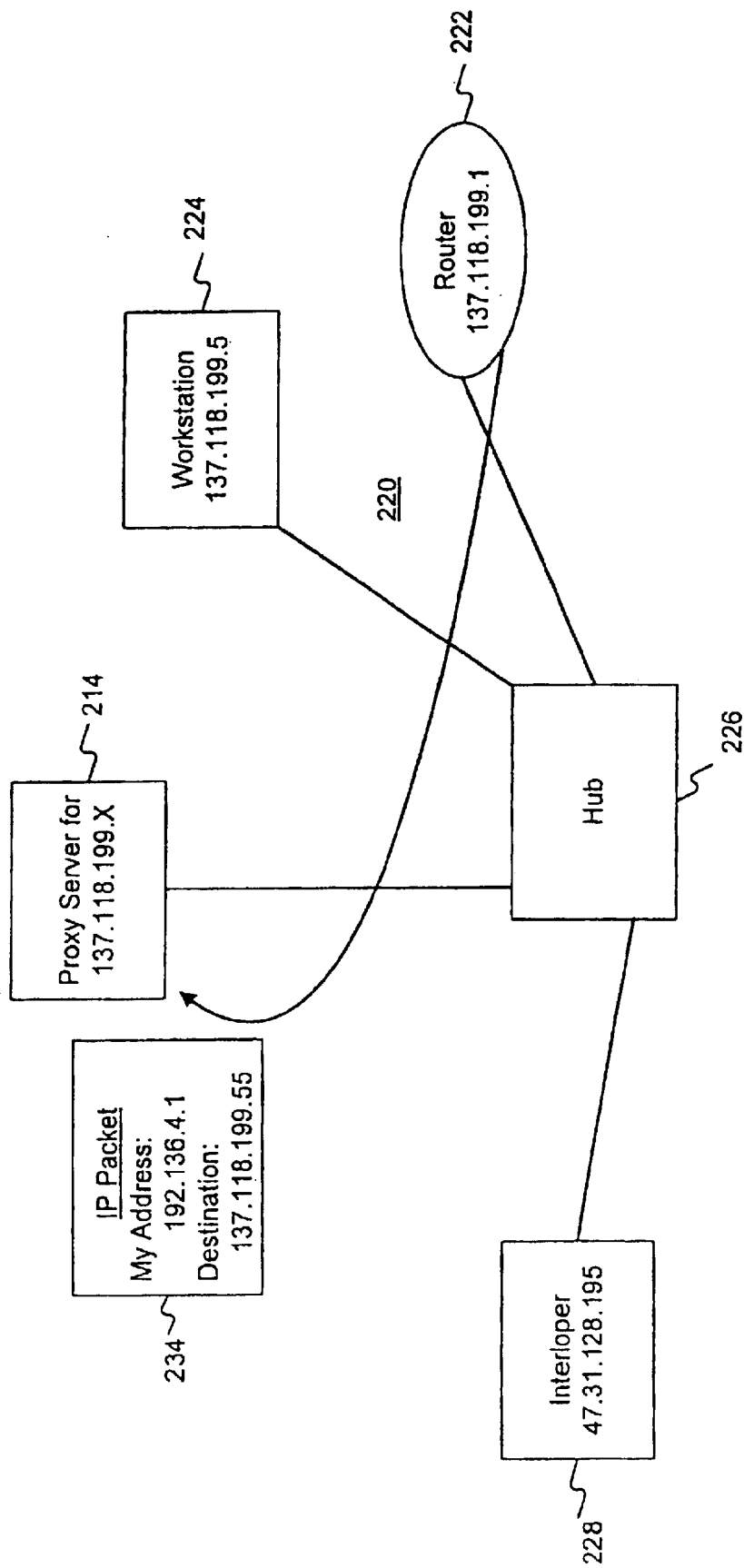
Figure 22:
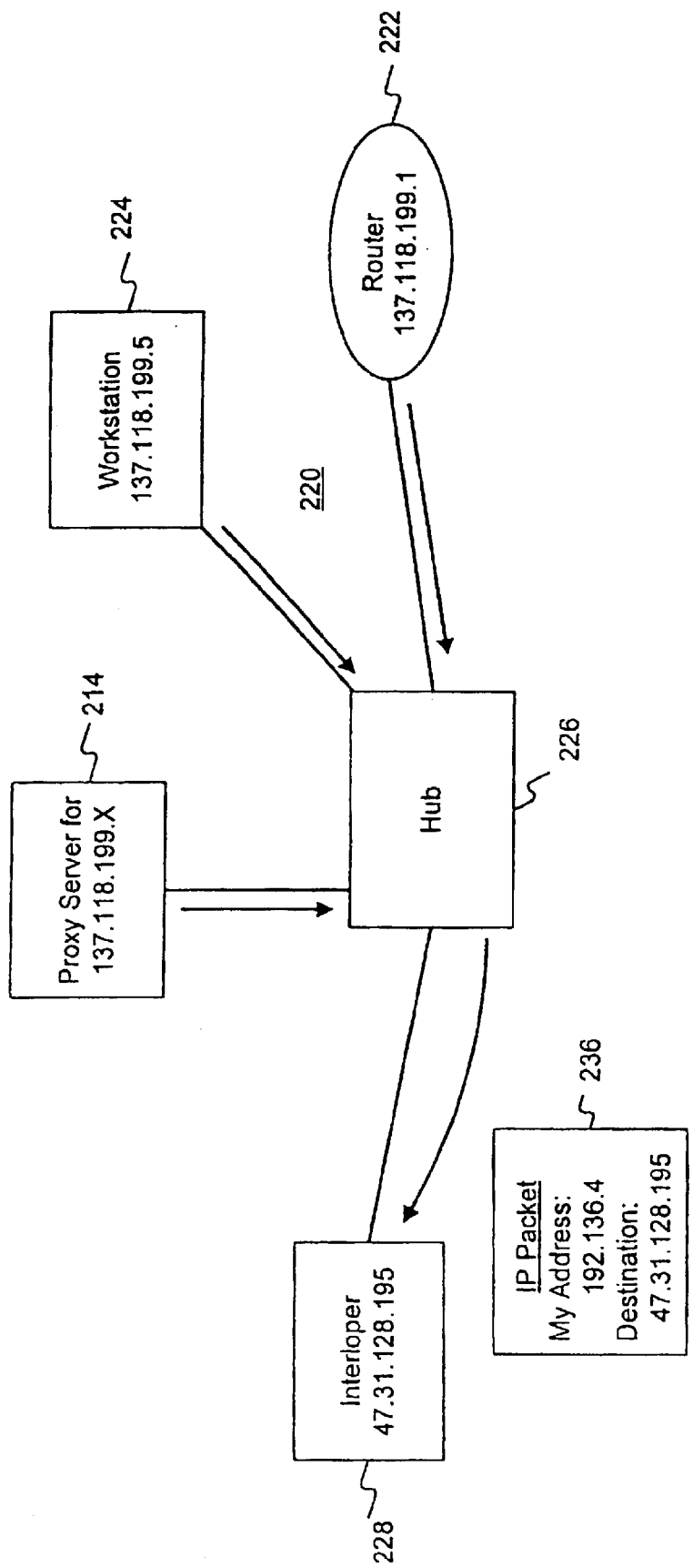

After the remote device receives the translated packet, it may generate a response packet. If so, the response packet 234 must be translated by proxy server 214 so that it can be delivered to interloper 228 (see FIG. 21). Router 222 knows that the .55 IP address is associated with a device on its network. In this case, the device happens to be proxy server 214, but the router is unaware of the presence of the server nor does it matter to the router that the destination is the proxy server and not a "normal" network device such as a workstation. Instead, router 222 simply forwards response packet 234 to proxy server 214, just like it would forward any other packet to other network devices. At about the same time the proxy server receives response packet 234, interloper 228 also receives the response packet from hub 226. However, since the interloper 228 knows that its IP address is 47.31.128.195, it throws the response packet away. Consistent with the present invention, proxy server 214 receives the response packet, performs a reverse network address translation, and sends a translated packet 236 back out on the LAN through hub 226 (see FIG. 22). Packet 236 is broadcast across the entire LAN, but since only one device on the network has IP address 47.31.128.19 (interloper 228), only that device will not discard the packet. Proxy server is able to specifically target the interloper by using the interloper's medium access control (MAC) address as the destination.

Proxy ARP

Figure 23:
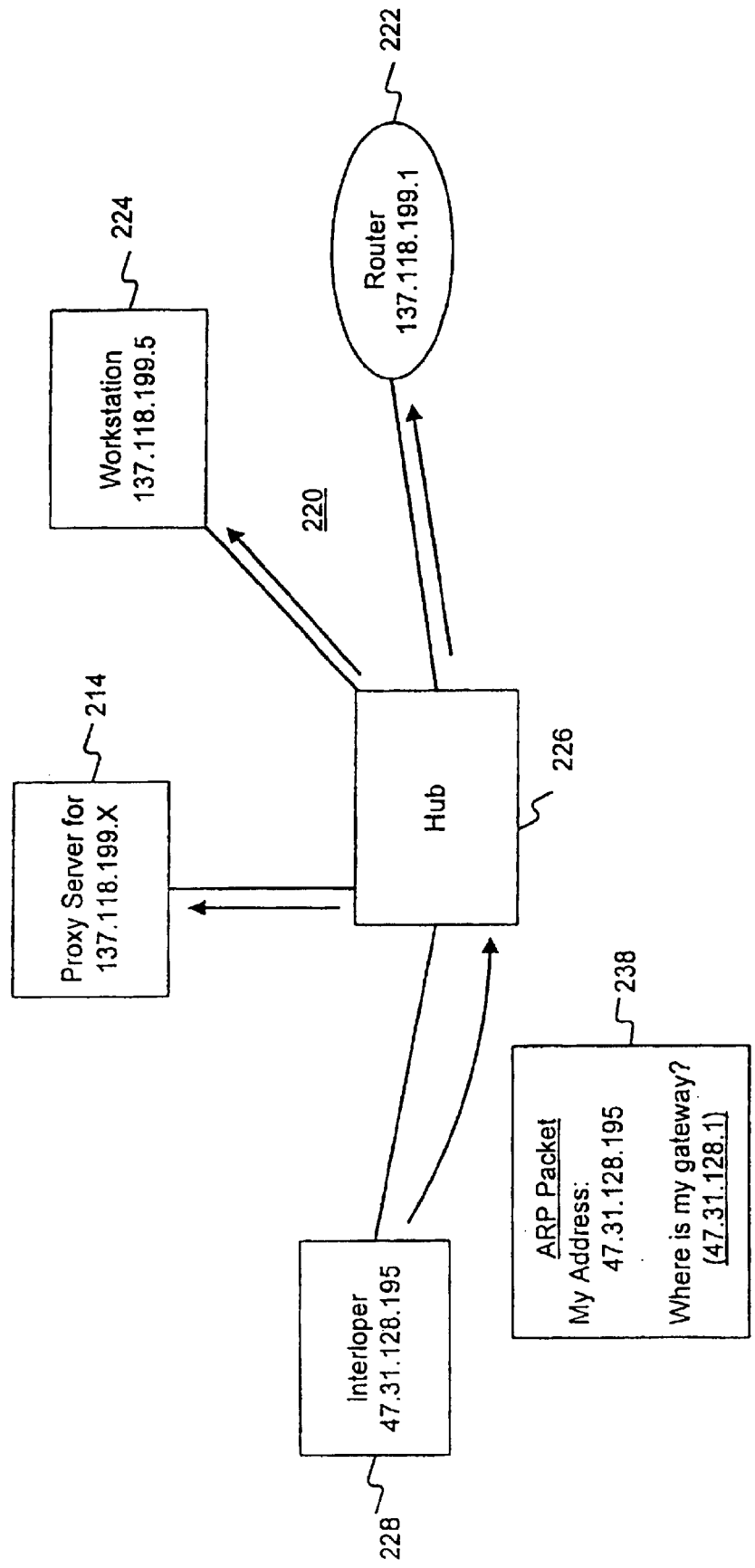
FIGS. 23–24 illustrate proxy ARP for use with the alternative proxy server implementation consistent with the present invention.
Figure 24:
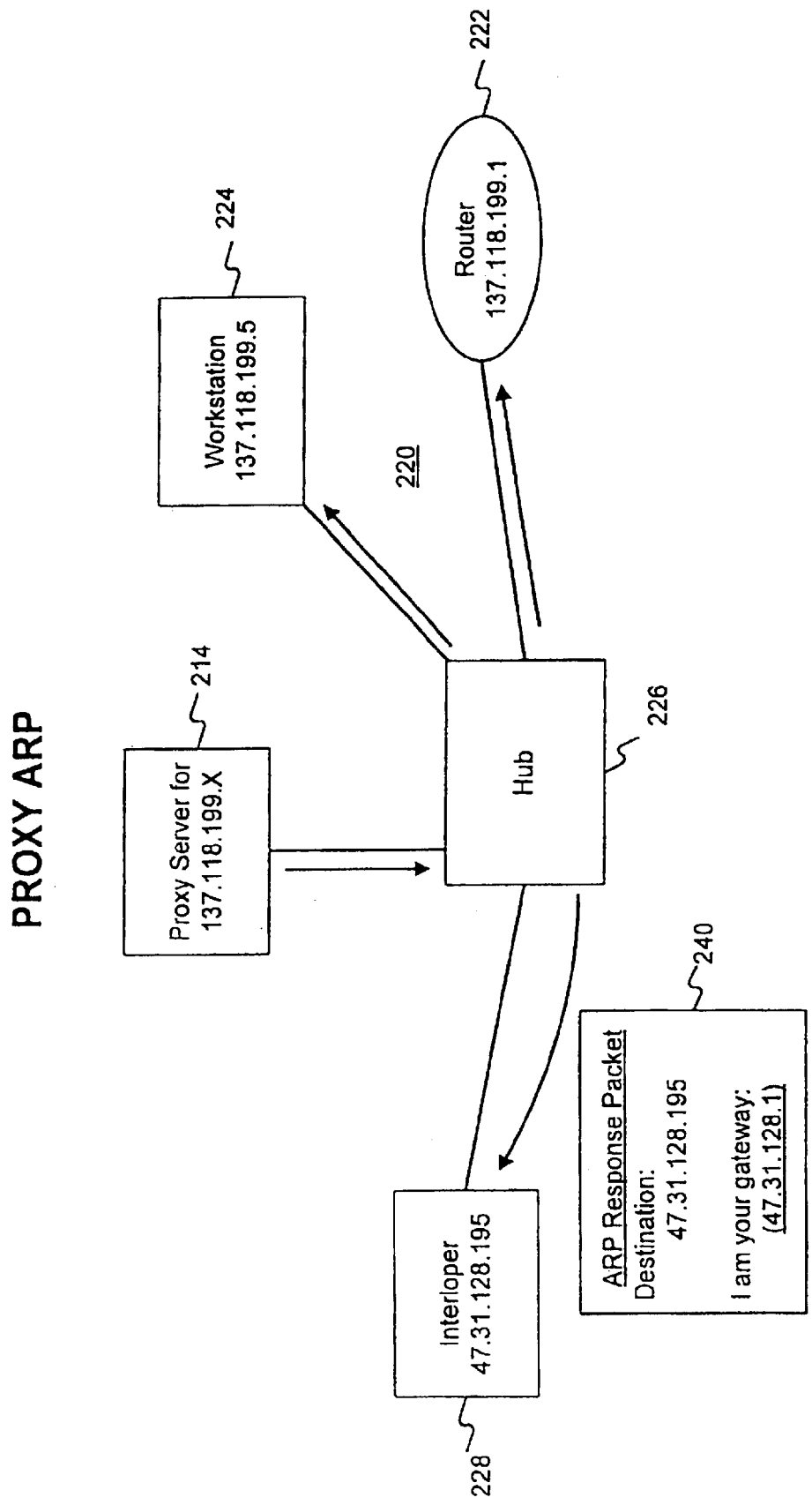

FIGS. 23 and 24 show a network environment useful for discussing the proxy ARP capabilities of proxy server 214. Interloper 228 may generate an ARP packet 238 in order to discover the MAC Address of its gateway device, i.e., 47.31.128.1. Normally, since no device in LAN 2has the appropriate MAC address, packet 238 would be ignored and interloper 228 would be unable to function. Consistent with the present invention, proxy server 214 will however recognize that packet 238 does not belong on the 137.118.199.X network and will automatically generate a response (see FIG. 24). Response packet 240 includes, as a destination address, the IP address of interloper 228, as well as a reply to the gateway query. Once interloper 228 receives packet 240, it considers the proxy server 214 to be its gateway device and will use the server for all further communications outside of the local LAN. The steps for proxy ARP performed by TA proxy server discussed above are equally applicable to proxy server 214.

Proxy DNS

Proxy server 214 is also capable of performing proxy DNS. If, from the point of view of the interloper, the DNS server is usually on the same LAN as the interloper, the interloper will generate an ARP request for the DNS server. Consistent with the present invention, the proxy server 214 will respond to the ARP request with its own address. Future DNS queries will be delivered directly to proxy server 214, which can then answer them. Similarly, if, from the point of view of the interloper, the DNS server is outside of the local LAN, i e., on a WAN, the proxy server will automatically receive the DNS query, since it is the interloper's gateway. In this case, proxy serve 214 will see the DNS query packets arrive and will be able to response to them locally. The steps for proxy DNS performed by TA proxy server discussed above are equally applicable to the proxy DNS service performed proxy server 214.

In addition to the features described above, proxy servers consistent with the present invention support certain security functions to improve network administration. For example, each time an interloper connects to an proxy server-enabled network, the proxy server will be able to provide connectivity for that user. To improve the security of the network, the proxy server will deliver a message to a specified network administrator e-mail account to the alert the administrator to the presence of this new user. While this is not ironclad security, it is a reasonable first step in network security.

Properly configured, proxy servers consistent with the present invention can provide interlopers with a secondary gateway. This has at least two benefits, including reduced congestion on the standard router and improved control over the interloper's internet access. Reduced congestion is a relatively straightforward concept, i.e., by using a different router than the standard network traffic, it reduces the possibility of excessive demand on router resources, that in turn might affect the performance of the standard network users. Further, by specifying a secondary gateway, the network administrator can funnel interlopers into a less open corporate environment, preventing those users from reaching sensitive material within the standard corporate network. This is one of the major benefits of the present invention over the straight DHCP model, for two reasons. First, if the network is served by a proxy server, a stand-alone DHCP server is not needed. The standard network users will not need to use DHCP on a day-to-day basis. Given the first constraint, everyone who uses DHCP is, by implication, an interloper and can be treated with additional security restrictions.

As for other protocols, one of ordinary skill will appreciate that proxy servers consistent with the present invention are only capable of supporting IP-based translation services. This is primarily because IP is both a LAN and WAN protocol. Other common LAN protocols, such as Apple Talk, or IPX are significantly limited in scope, and are not capable of the "long range" communications that make the proxy server translation services possible. However, it may be possible for "bridges" to be built to allow IPX-based computers to communicate with their "home" networks. However, this must currently be resolved on a case-by-case basis.

It will be appreciated by those skilled in this art that various modifications and variations can be made to the IP mobility service strategy consistent with the present invention described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A system for allowing mobile computers to function in a first network, said system comprising:
   a router associated with the first network adapted to respond to internet protocol (IP) addresses that fall within a predetermined range;
   a proxy router adapted to facilitate communication between a mobile computer having an address outside the predetermined range of the router, said mobile computer being associated with said first network, said proxy router comprising memory and a processor programmed to:
   respond to an address request protocol message from the mobile computer to spoof the mobile computer into treating the proxy router as the mobile computer's gateway;
   perform a proxy domain name service to identify a destination address in the network based on a destination name provided by the mobile computer; and
   perform a network address translation function on messages from the mobile computer such that an originating address of the mobile computer is translated to an address within the predetermined range.

2. The system of claim 1 wherein the processor programmed to perform the proxy domain name service communicates with a remote name server to determine the destination address.

3. The system of claim 2 wherein the proxy router communicates with the remote name server directly.

4. The system of claim 2 wherein the proxy router communicates with the remote name server through the router.

5. The system of claim 1 wherein the processor adapted to perform a network address translation function listens to messages on the network to determine if an address is outside the predetermined range such that the network address translation function is required.

6. The system of claim 1 wherein the proxy router communicates with a second network and routes messages from the mobile computer to the second network.

7. The system of claim 1 wherein the proxy router communicates with a second network through the router and routes messages from the mobile computer to the second network through the router.

8. A method for providing communication service to a mobile computer, comprising:
   selectively connecting the mobile computer to a first network having a router that accepts messages only from internet protocol (IP) addresses in a predetermined range;
   sending a message from the mobile computer having an origination address that falls outside the predetermined range;
   listening for messages having origination addresses that fall outside the predetermined range with a proxy router; and
   responding from the proxy router to at least one message from the mobile computer.

9. The method of claim 8 wherein sending a message from the mobile computer comprises sending an address resolution protocol message.

10. The method of claim 9 further comprising responding to the address resolution protocol message with a message from the proxy router that spoofs the mobile computer into treating the proxy router as a gateway.

11. The method of claim 8 wherein sending a message from the mobile computer comprises sending a message to a device within the first network and wherein the proxy router translates the origination address using a network address translation function.

12. The method of claim 8 wherein sending a message from the mobile computer comprises sending a message to a deice within a second network and wherein the proxy router forwards the message to the second network directly.

13. The method of claim 8 wherein sending a message from the mobile computer comprises sending a message to a device within a second network and wherein the proxy router forwards the message to the second network through a gateway associated with the first network.

14. The method of claim 8 further comprising connecting to a remote name server in response to a domain name received from the mobile computer.

15. The method of claim 14 wherein connecting to a remote name server comprises connecting the proxy router to the remote name server through a gateway associated with the first network.

16. The method of claim 14 wherein connecting to a remote name server comprises connecting the proxy router directly to a second network associated with the remote name server and the proxy server communicating on the second network.

* * * * *